(12) United States Patent
Luken

(10) Patent No.: US 11,667,195 B2
(45) Date of Patent: Jun. 6, 2023

(54) DISPLAY SYSTEM FOR A VEHICLE

(71) Applicant: Honda Motor Co., Ltd., Tokyo (JP)

(72) Inventor: Todd R. Luken, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 474 days.

(21) Appl. No.: 16/714,372

(22) Filed: Dec. 13, 2019

(65) Prior Publication Data

US 2021/0178897 A1 Jun. 17, 2021

(51) Int. Cl.
| | | |
|---|---|---|
| *B60K 35/00* | (2006.01) | |
| *G09G 5/04* | (2006.01) | |
| *G09G 5/37* | (2006.01) | |
| *G07C 5/08* | (2006.01) | |

(52) U.S. Cl.
CPC ............ *B60K 35/00* (2013.01); *G07C 5/0825* (2013.01); *G09G 5/04* (2013.01); *G09G 5/37* (2013.01); *B60K 2370/155* (2019.05); *B60K 2370/1526* (2019.05); *B60K 2370/1529* (2019.05); *B60K 2370/167* (2019.05); *B60K 2370/188* (2019.05); *G09G 2380/10* (2013.01)

(58) Field of Classification Search
None
See application file for complete search history.

(56) References Cited

U.S. PATENT DOCUMENTS

| | | | |
|---|---|---|---|
| 7,729,514 B2 | 6/2010 | Itoh et al. | |
| 8,339,400 B2 | 12/2012 | Katoh et al. | |
| 8,570,308 B2 | 10/2013 | Ogasawara | |
| 8,830,260 B2 | 9/2014 | Ogasawara et al. | |
| 9,120,380 B2 | 9/2015 | Kobayashi | |
| 9,269,169 B2 | 2/2016 | Morimoto et al. | |
| 9,463,693 B2 | 10/2016 | Oishi | |
| 9,466,264 B2 | 10/2016 | Oishi | |
| 10,040,354 B2 | 8/2018 | Fujita et al. | |
| 2008/0018488 A1 | 1/2008 | Struck et al. | |
| 2012/0223964 A1* | 9/2012 | Oishi ...................... | B60K 37/02 345/629 |

(Continued)

FOREIGN PATENT DOCUMENTS

| | | |
|---|---|---|
| CN | 100592087 C | 2/2010 |
| DE | 102011114392 A1 | 3/2013 |

(Continued)

*Primary Examiner* — Navid Z. Mehdizadeh
(74) *Attorney, Agent, or Firm* — Suzanne Gagnon; American Honda Motor Co., Inc.

(57) ABSTRACT

A display system for providing information display. The display system includes a display device, and control circuitry that controls the display device to display a gauge graphic including a scale for a vehicle parameter and a needle movable on the scale. The scale comprises a plurality of regions. The control circuitry further receives a first value of the vehicle parameter. The control circuitry further controls, based on a determination that the first value is between a first predetermined threshold and a second predetermined threshold, the display of a background color gradient on a first region of the plurality of regions based on the first value. The control circuitry further extends the background color gradient on a second region of the plurality of regions based on a determination that the first value exceeds the second predetermined threshold. The second region displays a solid color based on the background color gradient.

18 Claims, 13 Drawing Sheets

(56) References Cited

U.S. PATENT DOCUMENTS

| | | | |
|---|---|---|---|
| 2014/0176322 A1 | 6/2014 | Kobayashi | |
| 2014/0182508 A1 | 7/2014 | Oishi | |
| 2015/0109756 A1* | 4/2015 | Choi | G01D 7/002 |
| | | | 362/23.01 |
| 2016/0094839 A1 | 3/2016 | Kobayashi | |
| 2016/0096432 A1 | 4/2016 | Kobayashi | |
| 2016/0236570 A1 | 8/2016 | Wakatsuki | |
| 2016/0311370 A1* | 10/2016 | Oyanagi | B60Q 9/00 |
| 2018/0202371 A1 | 7/2018 | Matsuoka | |
| 2020/0215970 A1* | 7/2020 | Lee | G06F 3/015 |

FOREIGN PATENT DOCUMENTS

| | | |
|---|---|---|
| JP | 2009101749 A | 5/2009 |
| JP | 4725530 B2 | 7/2011 |
| JP | 5020771 B2 | 9/2012 |
| JP | 2016043862 A | 4/2016 |
| JP | 6165015 B2 | 7/2017 |
| JP | 6211501 B2 | 10/2017 |
| JP | 6220166 B2 | 10/2017 |
| JP | 6278655 B2 | 2/2018 |
| WO | 2018051420 A1 | 2/2019 |

\* cited by examiner

| | Driver Input 502 | | Sensory Feedback 504 | | | | Meter Indications 506 | | | | |
|---|---|---|---|---|---|---|---|---|---|---|---|
| S.No. 508 | Driving Scenario 510 | Accelerator Pedal Information 512 | Accelerator Feeling Information 514 | Sound 516 Tone/Pitch 518 | Sound 516 Sound Level 520 | G-Meter (Feeling) 522 | Tach (Sound) 524 | Vehicle Speed (Sound) 526 | Power Meter (Sound & Feeling) 528 | Judgment 530 |
| 1 | 1st gear Launch WOT | WOT | High Accel G | Increasing | Increasing (high) | High Accel G | Increasing | ↑ | ↑ | Matches Driver Expectation |
| 2 | Low NE (cruise→Decel) | Off | Light Decel G | Low | Low | Light Decel G | Decreasing | ↓ | Low | Matches Driver Expectation |
| 3 | Low NE (cruise→Accel) | Light | Light Accel G | Low | Low | Light Accel G | Slowly Increasing | ↑ | ↑ | Matches Driver Expectation |
| 4 | Low NE (paddle) | WOT | Medium Accel | Low | Medium | Medium Accel | Increasing | ↑ | Medium | Matches Driver Expectation |
| 5 | High NE (paddle) | Off | High Decel G | High | Low | High Decel G | Decreasing | ↓ | Low | Matches Driver Expectation |
| 6 | High NE (paddle) | Light | Light Accel G | High | Medium | Light Accel G | Increasing | ↑ | Medium | Matches Driver Expectation |
| 7 | High NE (paddle) | WOT | High Accel G | High | High | High Accel G | Increasing | ↑ | High | Matches Driver Expectation |
| 8 | Creep | Off | Low Accel G | Low | Low | Low Accel G | Slowly Increasing | ↑ | Low | Matches Driver Expectation |
| 9 | Idle Snap | On | None | Increasing | Increasing | None | Increasing | 0 | Increasing | Matches Driver Expectation |
| 10 | Engine Off | On | None | None | None | None | ↓ | ↓ | ↓ | Matches Driver Expectation |

FIG. 5

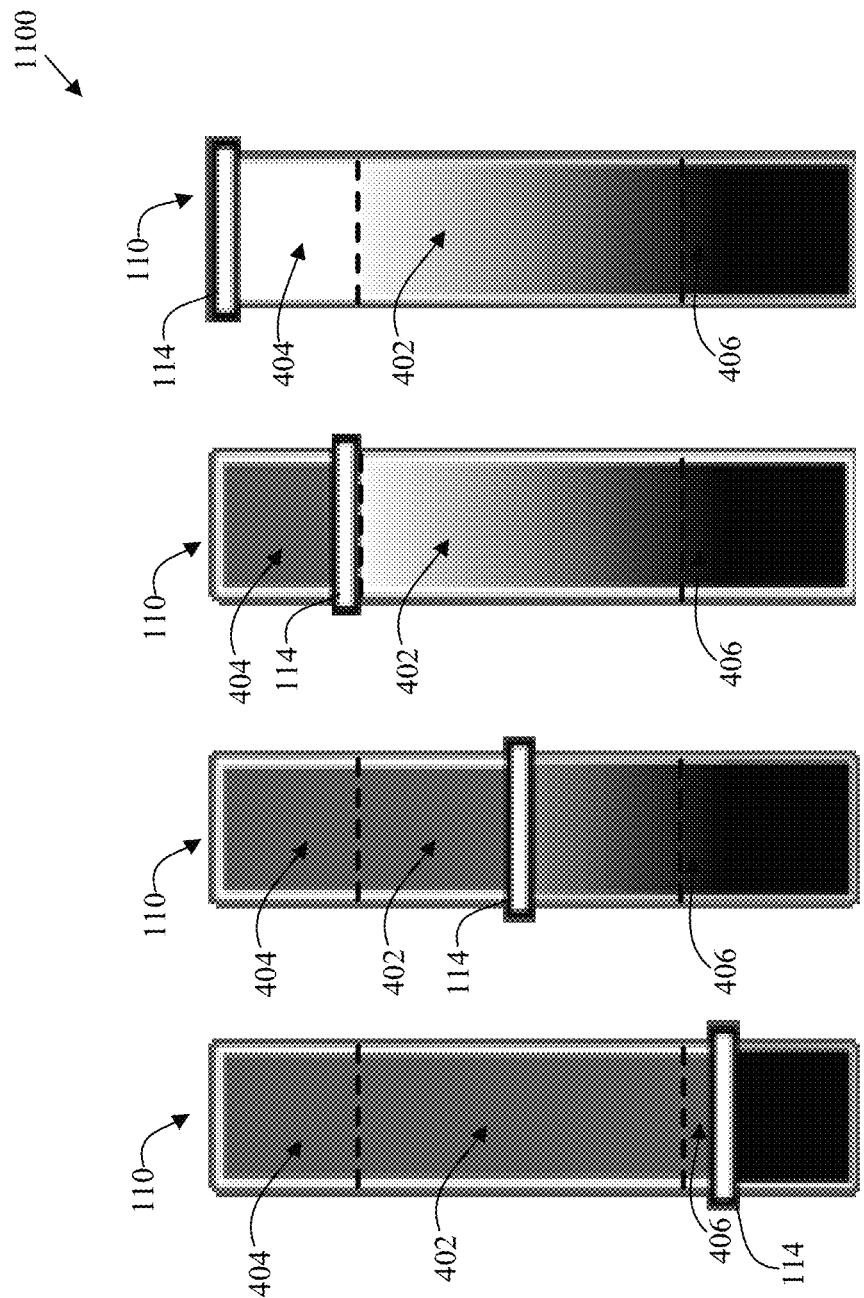

DISPLAY SYSTEM FOR A VEHICLE

BACKGROUND

Many new technologies are being developed to display vehicle parameters, (such as, vehicle speed, engine revolutions per minute (RPM), gear ratio, vehicle acceleration, distance, fuel economy, and the like) on instrument panels of a vehicle. Typically, values of the vehicle parameters are displayed to a driver on different analog and digital displays. In general, the vehicle parameters may change based on different driving conditions, for example, an idle state, an off state, a moving state, or an acceleration state, and the like. Certain conventional techniques provide display of the vehicle parameters in accordance with the changes in the driving conditions or driving modes, such as, sports mode, eco mode, and the like. However, conventional displays merely display the values of the vehicle parameters regardless of driver's intent. This may affect visual ergonomics of the displayed values and the driver may, at times, find the displayed values to be less engaging for an emotional level that the driver might experience while driving. Thus, an advanced display system for the vehicle may be desired which may display the vehicle parameters and may further reflect or enhance the driver's intent or emotional level in certain driving conditions, in order to achieve a man-machine synergy effect.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An exemplary aspect of the disclosure provides a display system of a vehicle for providing information display. The display system may include a display device and a control circuitry communicatively coupled to the display device. The control circuitry may be configured to control the display device to display a gauge graphic which may comprise a scale for a vehicle parameter and a needle configured to be movable on the scale. The scale may comprise a plurality of regions. The control circuitry may be further configured to receive a first value of the vehicle parameter associated with the vehicle. The control circuitry may be further configured to control, based on a determination that the received first value may be between a first predetermined threshold and a second predetermined threshold, the display of a background color gradient on a first region of the plurality of regions of the scale based on the received first value. The control circuitry may be further configured to extend the displayed background color gradient on a second region of the plurality of regions of the scale based on a determination that the received first value may exceed the second predetermined threshold. The second region may be configured to display a solid color based on the background color gradient.

Another exemplary aspect of the disclosure provides a method for providing information display. Any computing device, for example, a display device, may execute operations specified in the method. The method may include controlling the display device to display a gauge graphic which may comprise a scale for a vehicle parameter and a needle configured to be movable on the scale. The scale may comprise a plurality of regions. The method may further include receiving a first value of the vehicle parameter associated with the vehicle. The method may further include controlling, based on a determination that the received first value may be between a first predetermined threshold and a second predetermined threshold, the display of a background color gradient on a first region of the plurality of regions of the scale based on the received first value. The method may further include extending the displayed background color gradient on a second region of the plurality of regions of the scale based on a determination that the received first value may exceed the second predetermined threshold. The second region may display a solid color based on the background color gradient.

This summary is provided to introduce a selection of concepts in a simplified form that are further disclosed in the detailed description of the present disclosure. This summary is not intended to identify key or essential inventive concepts of the claimed subject matter, nor is it intended for determining the scope of the claimed subject matter.

BRIEF DESCRIPTION OF THE DRAWINGS

FIG. 5 illustrates a table indicating exemplary scenarios for providing information display, in accordance with an embodiment of the disclosure.

FIGS. 11A, 11B, 11C, and 11D, collectively, illustrates another exemplary scenario for information display by the display system of FIG. 2, in accordance with an embodiment of the disclosure.

Figure 1:
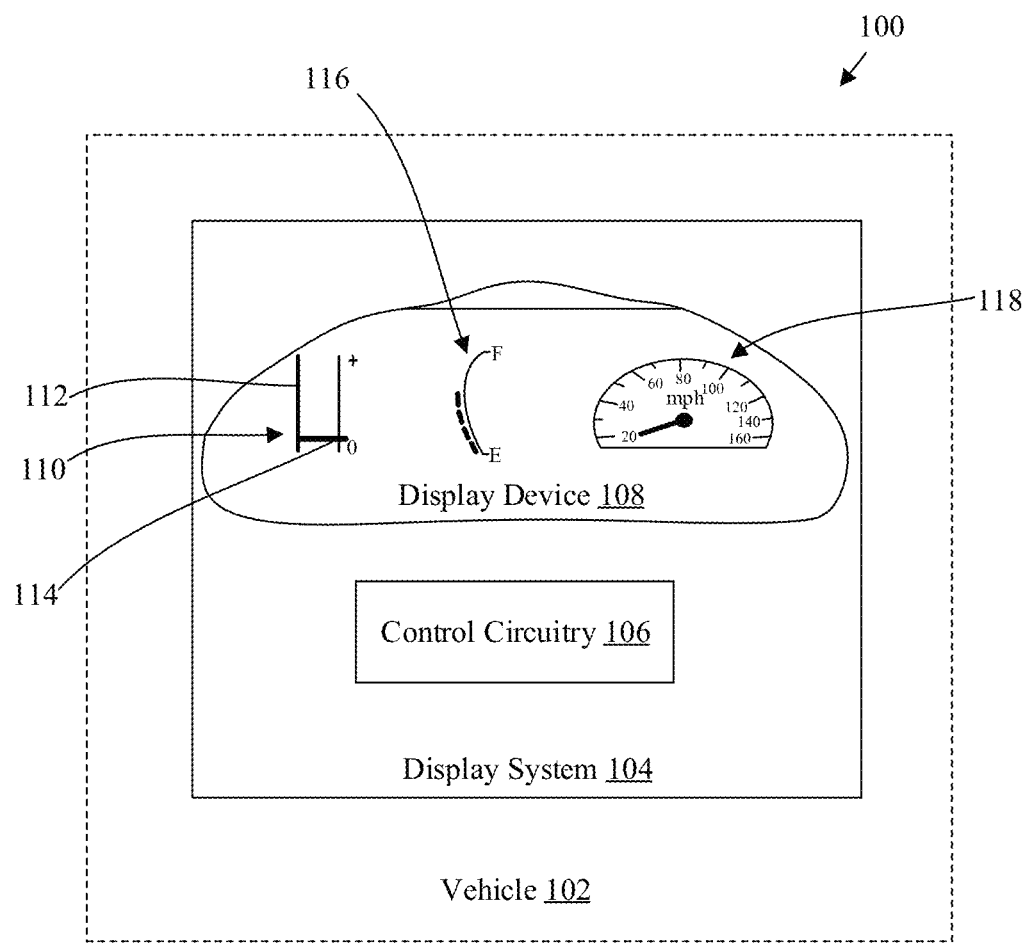
FIG. 1 illustrates an exemplary environment for a display system of a vehicle for information display, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

Various embodiments of the present disclosure may be found in a display system of a vehicle to provide information display, for example, display of vehicle parameters such as vehicle power. The display system may be integrated or associated with a vehicle, for example, an autonomous or semi-autonomous vehicle. The display system may display a gauge graphic. The gauge graphic may include a scale that may include a plurality of regions associated with a vehicle parameter of the vehicle. The gauge graphic may further include a needle that may be movable on the scale. Further, the display system may receive a value of the vehicle parameter associated with the vehicle. The display system may control the display of a background color gradient on a first region of the plurality of regions on the scale based on a determination that the received value may be between a first predetermined threshold and a second predetermined threshold. The display system may further extend the displayed background color gradient on a second region of the plurality of regions based on a determination that the value may exceed the second predetermined threshold. The second region may display a solid color based on the background color gradient. The vehicle parameter of the vehicle may be, for example, power of an engine of the vehicle or relative power of the engine. The disclosed display system provides a visual indication of the vehicle parameter by variations of the background color gradient in accordance with the received value of the vehicle parameter with respect to different predetermined thresholds. Therefore, the disclosed display system provides the gauge graphic which may display the vehicle parameter to reflect or enhance the driver's intent or match an emotion level of the driver or other occupants in relation to the performance of the vehicle to achieve a man-machine synergy effect.

Reference will now be made in detail to specific aspects or features, examples of which are illustrated in the accompanying drawings. Wherever possible, corresponding or similar reference numbers will be used throughout the drawings to refer to the same or corresponding parts.

FIG. 1 illustrates an exemplary environment for a display system of a vehicle for information display, in accordance with an embodiment of the disclosure. With reference to FIG. 1, there is shown an exemplary environment 100. The exemplary environment 100 may further include a vehicle 102. The vehicle 102 may further include a display system 104. The display system 104 may comprise control circuitry 106 and a display device 108. There is further shown in FIG. 1, a gauge graphic 110, a fuel meter 116, and a speedometer 118 on the display device 108. The gauge graphic 110 may include a scale 112 and a needle 114 configured to be movable on the scale 112.

The vehicle 102 may be a non-autonomous vehicle, a semi-autonomous vehicle, or a fully autonomous vehicle, for example, as defined by National Highway Traffic Safety Administration (NHTSA). Examples of the vehicle 102 may include, but are not limited to, a two-wheeler vehicle, a three-wheeler vehicle, a four-wheeler vehicle with either a two-wheel drive or a four-wheel drive, a multi-axle vehicle, a work vehicle, a hybrid vehicle, or a vehicle with autonomous drive capability. The vehicle may be powered by renewable or non-renewable power sources which may include a fossil fuel-based vehicle, an electric propulsion-based vehicle, a hydrogen fuel-based vehicle, a solar-powered vehicle, and/or a vehicle powered by other forms of alternative energy sources. Examples of the vehicle 102 may include, but are not limited to, an electric vehicle, an internal combustion engine (ICE)-based vehicle, a fuel-cell based vehicle, a solar powered-vehicle, or a hybrid vehicle.

The display system 104 may include suitable logic, circuitry, interfaces, and/or code that may be configured to render information (for example an audio-based data, a video-based data, and/or a user interface) related to the vehicle 102. The information that may correspond to at least a plurality of vehicle parameters (such as speed, distance, fuel, revolutions per minute (RPM), engine power, relative engine power, drive mode, and the like), a predefined media content (for example, an image or movie), and navigation information for the vehicle 102. The display system 104 may execute a plurality of operations to display the information. Examples of the display system 104 may include, but are not limited to, automotive Head-UP Display (HUD) system, a Multi-Information Display (MID), Add-on HUD system, a Multi-display Infotainment system, or an instrument cluster.

The control circuitry 106 may include suitable logic, circuitry, interfaces, and/or code that may be configured to execute program instructions associated with different operations to be executed by the display system 104. For example, some of the operations may include reception of a first value of a vehicle parameter of the plurality of vehicle parameters associated with the vehicle 102, comparison of the received first value with a first predetermined threshold and a second predetermined threshold, and control of the display device 108 to display a gauge graphic 110 based on the received first value and the comparison. The control circuitry 106 may include one or more specialized processing units, which may be implemented as separate processors. In an embodiment, the one or more specialized processing units may be implemented as an integrated processor or a cluster of processors that perform the functions of the one or more specialized processing units, collectively. The control circuitry 106 may be implemented based on a number of processor technologies known in the art. Examples of the control circuitry 106 may include, but are not limited to, an x86-based processor, a Graphical Processing Unit (GPU), a Reduced Instruction Set Computer (RISC) processor, an Application Specific Integrated Circuit (ASIC) processor, a Complex Instruction Set Computer (CISC) processor, a microcontroller, a Central Processing Unit (CPU), and/or a combination thereof.

The display device 108 may include suitable logic, circuitry, interfaces, and/or code that may be configured to display the plurality of vehicle parameters of the vehicle 102. In accordance with an embodiment, the display device 108 may be configured to display the plurality of vehicle parameters on corresponding display sections, such as, the gauge graphic 110, the fuel meter 116, the speedometer 118, and the like displayed on the display device 108. The display device 108 may be further configured to display the predefined media content (for example, an image or movie). The details associated with the display of the gauge graphic 110 may be described, for example, in FIGS. 4A, 4B, and 4C. The display device 108 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 108 may refer to, but no limited to, a Multi-Information Display (MID), an automotive HUD, or an instrument cluster.

A person of ordinary skill in the art will understand that the vehicle 102 or the display system 104 may also include other suitable components or systems, in addition to the components or systems which are illustrated in FIG. 1 to describe and explain the function and operation of the present disclosure. A detailed description for the other components or systems of the vehicle 102 and the display system 104 has been omitted from the disclosure for the sake of brevity.

It may be noted that the gauge graphic 110, the fuel meter 116, and the speedometer 118 shown in FIG. 1 are presented merely as examples. The present disclosure may be also applicable to other types of gauge graphics, fuel meters and speedometers. A description of other types has been omitted from the disclosure for the sake of brevity. Further, the display device 108 may include other graphical elements which may provide information about various vehicle parameters. A detailed description for the other graphical elements has been omitted from the disclosure for the sake of brevity.

In operation, the control circuitry 106 of the display system 104 may be configured to control the display device 108 to display the gauge graphic 110 that includes the scale 112 and the needle 114. The needle 114 may be configured to be movable on the scale 112. The scale 112 may further comprise a plurality of regions (for example a plurality of regions 402-406 shown in FIGS. 4A, 4B, and 4C). One or more of the plurality of regions of the scale 112 may include a corresponding background color gradient. The background color gradient may indicate a variation of at least one predefined color. In an embodiment, the background color gradient may indicate a variation of multiple predefined colors different from each other. The details of the plurality of regions is described further, for example in FIGS. 4A-4C.

The control circuitry 106 may be further configured to receive a first value of a vehicle parameter associated with the vehicle 102. The vehicle parameter may include, but not limited to, an engine power or relative engine power associated with the vehicle 102. The first value may be received from at least one of an electronic control unit (ECU) of the vehicle 102 or a sensor associated with the vehicle 102. The details for the operations to receive the first value of the vehicle parameter may be described further, for example, in FIGS. 4A-4C, and FIG. 6. The control circuitry 106 may be further configured to determine that whether the received first value may be between a first predetermined threshold and a second predetermined threshold associated with the vehicle perimeter. In accordance with the determination, the control circuitry 106 may be further configured to control the display of the background color gradient on a first region of the plurality of regions. Further, the control circuitry 106 may be configured to determine whether the received first value has exceeded the second predetermined threshold. Further, in accordance with the determination, the control circuitry 106 may be configured to extend the displayed background color gradient on a second region of the plurality of regions. The second region may be configured to display a solid color based on the background color gradient. The solid color may correspond to a predefined dark color shade with respect to the variation of the predefined color associated with the background color gradient. Thus, the disclosed display system 104 may provide a visual cue or an enhanced view of the vehicle parameter to a driver or other occupants of the vehicle 102, based on display of the background color gradient and solid color on the plurality of regions of the scale. This visual cue or enhanced view of the display on the gauge graphic 110 may further reflect or enhance the driver's intent or match an emotion level of the driver or other occupants in relation to the change in the vehicle parameter. The gauge graphic 110 may further complement existing audio (such as, engine sound) and acceleration cues (such as RPM and speed) of the vehicle 102. The detailed operation for display of the vehicle parameters in the plurality of regions of the scale 112 based on the predetermined thresholds may be described further, for example, in FIGS. 3, 4A-4C, and 10A-10F.

In accordance with embodiments of the disclosure, the control circuitry 106 may be further configured to control the movement of the needle 114 on the scale 112 of the gauge graphic 110 based on the received first value of the vehicle parameter. The control circuitry 106 may be further configured to control the movement of the needle 114 on the scale 112 to indicate a plurality of driving conditions associated with the vehicle 102 and a plurality of emotion modes associated with the driver of the vehicle 102. The control circuitry 106 may be further configured to convert the received first value of the vehicle parameter into a display value (or display signal) associated with the scale 112 of the gauge graphic 110. The control circuitry 106 may control the movement of the needle 114 on the scale 112 based on the converted display value associated with the scale 112. In an embodiment, the movement of the needle 114 on the scale 112 may correspond to the changes in the background color gradient of the gauge graphic 110.

Figure 2:
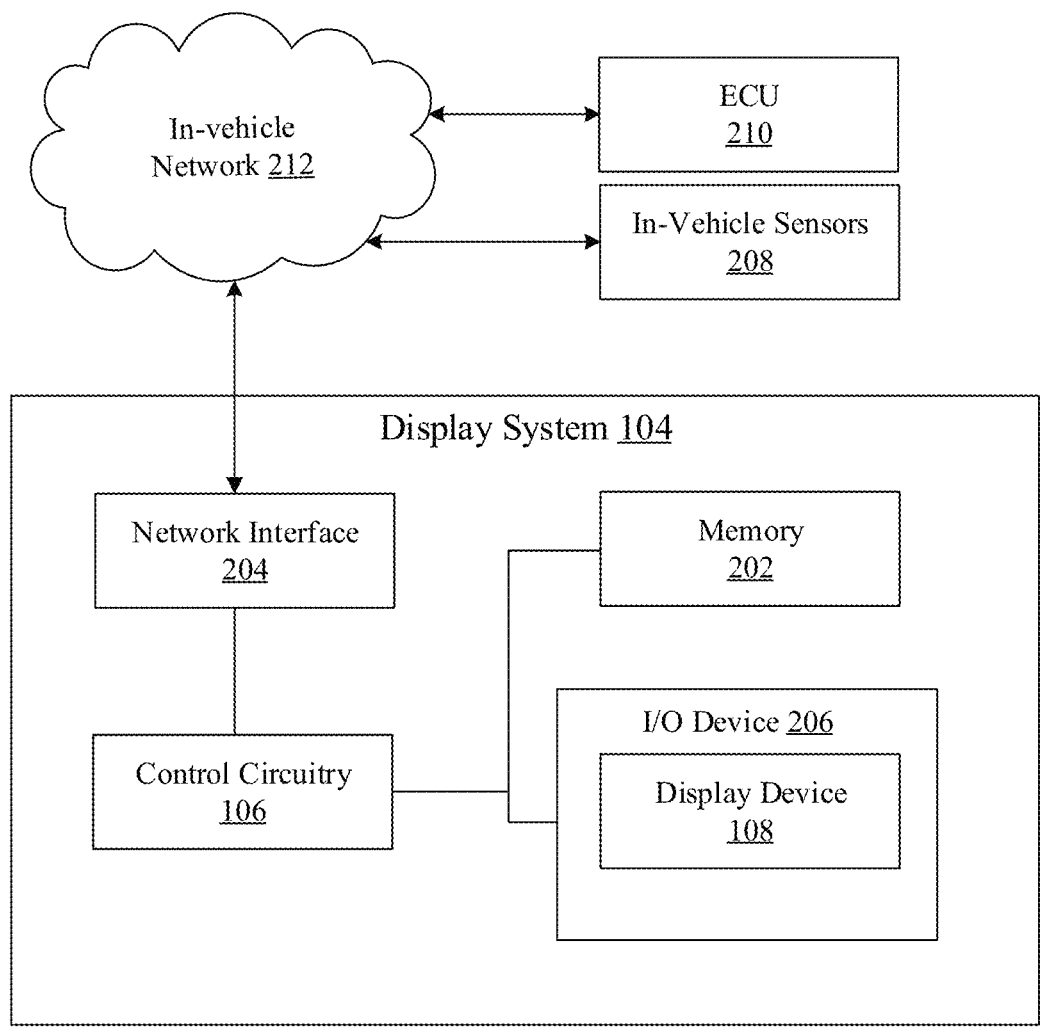
FIG. 2 illustrates a block diagram of an exemplary display system of a vehicle for information display, in accordance with an embodiment of the disclosure.

FIG. 2 illustrates a block diagram of an exemplary display system of a vehicle for information display, in accordance with an embodiment of the disclosure. FIG. 2 is explained in conjunction with elements from FIG. 1. With reference to FIG. 2, there is shown the display system 104. The display system 104 may include the control circuitry 106, a memory 202, a network interface 204, and an input/output (I/O) device 206. The I/O device 206 may include the display device 108. As further shown in FIG. 2, the control circuitry 106 may be connected to the I/O device 206, the memory 202, and the network interface 204 through wired or wireless connections. In FIG. 2, there is further shown in-vehicle sensors 208 and an electronic control unit (ECU) 210 of the vehicle 102. There is further shown an in-vehicle network 212 that may connect the display system 104 to the in-vehicle sensors 208 and the ECU 210. The control circuitry 106 may be configured to communicate with the in-vehicle sensors 208 and the electronic control unit (ECU) 210 though the network interface 204 and the in-vehicle network 212.

The memory 202 may include suitable logic, circuitry, interfaces, and/or code that may store a set of instructions executable by the control circuitry 106. The memory 202 may be configured to store the received first value of the vehicle parameter. The memory 202 may be configured to store the first predetermined threshold and the second predetermined threshold that may be compared with the received first value. Further, the memory 202 may be configured to store a predefined media content to be rendered on the display device 108. In accordance with an embodiment, the memory 202 may be configured to store values of a plurality of vehicle parameters associated with the vehicle 102. The memory 202 may be a persistent storage medium, a non-persistent storage medium, or a combination thereof. Examples of implementation of the memory 202 may include, but are not limited to, Random Access Memory (RAM), Read Only Memory (ROM), Hard Disk Drive (HDD), Solid State Drive (SSD), flash memory, cache memory, and/or a Secure Digital (SD) card.

The network interface 204 may include suitable logic, circuitry, interfaces, and/or code that may enable communication among the display system 104 and other external devices, such as the in-vehicle sensors 208 and the ECU 210 of the vehicle 102, via the in-vehicle network 212. The network interface 204 may implement known technologies to support wired and/or wireless communication via the in-vehicle network 212. The network interface 204 may include, but is not limited to, an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 204 may further communicate via wired and/or wireless communication with networks, such as the Internet, an Intranet and/or a wireless network, such as a cellular telephone network, a wireless local area network (LAN) and/or a metropolitan area network (MAN). The network interface 204 may be controlled by the control circuitry 106 to communicate with an external device (such as the in-vehicle sensors 208 and the ECU 210) or with a server to receive the first value of the vehicle parameters, the first predetermined threshold, the second predetermined threshold, system updates, updates related to appearance of the gauge graphic 110, and the like, via the in-vehicle network 212. The communication may use any of a plurality of communication standards, protocols and technologies, such as Long Term Evolution (LTE), Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.120g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The I/O device 206 may comprise suitable logic, circuitry, interfaces, and/or code that may be configured to receive one or more inputs from occupants of the vehicle 102, for example, the driver of the vehicle 102. The I/O device 206 may also be configured to display output (for example, the gauge graphic 110) to the driver or occupants of the vehicle 102. The I/O device 206 may be further configured to provide the one or more received user inputs to the control circuitry 106 to change display settings of the gauge graphic 110 and/or control the operations of the ECU 210 of the vehicle 102. The I/O device 206 may be further configured to receive output (for example converted display value) from the control circuitry 106 to be displayed on the display device 108. Examples of the I/O device 206 may include, but are not limited to, a touchscreen interface, a touch pad, a keyboard, a microphone, a camera, a computer mouse, the display device 108, and a speaker.

The in-vehicle sensors 208 may include suitable logic, circuitry, interfaces, and/or code that may configured to detect and/or capture one or more vehicle parameters of the vehicle 102. The vehicle parameters may correspond to performance of components of the vehicle 102, for example, an engine, an accelerator pedal or throttle, a clutch pedal, a transmission system, a battery, a drive motor, a braking system, a steering system, and the like. The vehicle parameters may indicate information including motion, an acceleration, a clutch engagement, a vehicle speed, an engine speed (for example RPM), an engine torque, a wheel torque, a gear position, a gear ratio, and the like. Examples of the in-vehicle sensors 208 may include, but are not limited to, an acceleration sensor, a vehicle speed sensor, a gear position sensor, an engine speed sensor, a RPM sensor, a plurality of torque sensors (for example, a wheel torque sensor and an engine torque sensor), an intake air temperature sensor, an ambient temperature sensor, an atmospheric pressure sensor, an acceleration pedal position sensor, an engine vibration sensor, an engine sound sensor, and the like.

The ECU 210 may include suitable logic, circuitry, interfaces, and/or code that may be configured to control different functions, such as, but not limited to, engine operations, transmission operations, braking operations, communication operations, steering control operations, data acquisition of the vehicle 102, and the like. The ECU 210 may control various electronic components of the vehicle 102. The ECU 210 may control the vehicle 102 or the in-vehicle sensors 208 to transmit the data (for example, the vehicle parameter) to the display system 104 to display the gauge graphic 110 on the display device 108. In accordance with an embodiment, the ECU 210 may be coupled with the in-vehicle sensors 208, via the in-vehicle network 212.

The ECU 210 may include a vehicle control system, an in-vehicle infotainment (IVI) system, an in-car entertainment (ICE) system, an automotive Head-up Display (HUD), an automotive dashboard, an embedded device, a smartphone, a human-machine interface (HMI), a computer workstation, a handheld computer, a cellular/mobile phone, a portable consumer electronic (CE) device, a server, and/or other computing devices. The ECU 210 may be included or integrated in the vehicle 102. In some cases, the control circuitry 106 of the display system 104 may be part of the ECU 210, and the operations of the control circuitry 106 may be executed by the ECU 210.

The in-vehicle network 212 may include a medium through which the various control units, components, and/or systems (for example, display system 104, the in-vehicle sensors 208, and the ECU 210) of the vehicle 102 may communicate with each other. In accordance with an embodiment, in-vehicle communication of audio/video data may occur by use of a multimedia network protocol of the in-vehicle network 212, such as Media Oriented Systems Transport (MOST), or other suitable network protocols for in-vehicle communication. The MOST-based network may be a separate network from the controller area network (CAN). The MOST-based network may use a plastic optical fiber (POF) medium. In accordance with an embodiment, the MOST-based network, the CAN, and other in-vehicle networks may co-exist in the vehicle 102. The in-vehicle network 212 may facilitate access control and/or communication between the control circuitry 106 and other ECUs, such as a telematics control unit (TCU) of the vehicle 102.

Various devices or components in the vehicle 102 may connect to the in-vehicle network 212, in accordance with various wired and wireless communication protocols. Examples of the wired and wireless communication protocols for the in-vehicle network 212 may include, but are not limited to, a vehicle area network (VAN), a CAN bus, Domestic Digital Bus (D2B), Time-Triggered Protocol (TTP), FlexRay, IEEE 1394, Carrier Sense Multiple Access With Collision Detection (CSMA/CD) based data communication protocol, Inter-Integrated Circuit (I$^2$C), Inter Equipment Bus (IEBus), Society of Automotive Engineers (SAE) J1708, SAE J1939, International Organization for Standardization (ISO) 11992, ISO 11783, Media Oriented Systems Transport (MOST), MOST25, MOST50, MOST150, Plastic optical fiber (POF), Power-line communication (PLC), Serial Peripheral Interface (SPI) bus, and/or Local Interconnect Network (LIN).

Figure 3:
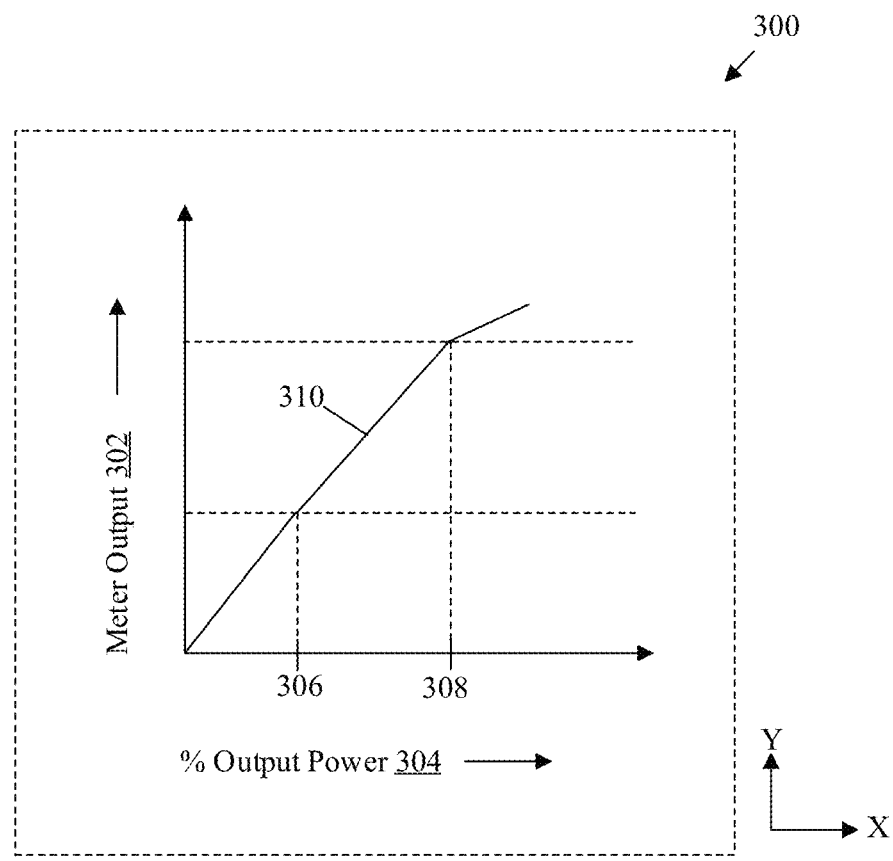
FIG. 3 illustrates a graph between the vehicle parameter and information to be displayed, in accordance with an embodiment of the disclosure.

FIG. 3 illustrates a graph between the vehicle parameter and information to be displayed, in accordance with an embodiment of the disclosure. FIG. 3 is explained in conjunction with elements from FIGS. 1 and 2. With reference to FIG. 3, there is shown a graph 300 that may include a meter output 302 on Y-axis of the graph 300 and a percentage (%) output power 304 of the engine on X-axis of the graph 300. The meter output 302 may be associated with the display of the gauge graphic 110 (i.e., background color gradient and the solid color on the plurality of regions (such as the plurality of regions 402-406 in FIGS. 4A-4C) on the scale 112). The percentage output power 304 may be the first value of the vehicle parameter of the vehicle 102. The percentage output power 304 may be associated with the power of the engine of the vehicle 102 or the power of the vehicle 102. For example, the percentage output power 304 may be a ratio of the vehicle power and a maximum available power for the vehicle as described, for example, in FIG. 6. In another example, the percentage output power 304 may be a relative power of the engine of the vehicle 102.

In FIG. 3, there is further shown a first predetermined threshold 306 and a second predetermined threshold 308 associated with the percentage output power 304 on the graph 300. A value of the first predetermined threshold 306 may be less than a value of the second predetermined threshold 308. In FIG. 3, there is further shown a curve between the first predetermined threshold 306 and the second predetermined threshold 308 as excitement or emotional level curve 310. The emotional level curve 310 may be associated with the meter output 302 and the percentage output power 304. It may be noted that the percentage output power 304 shown in FIG. 3 is presented merely as an example. The present disclosure may be also applicable to other types of vehicle parameters, without a deviation from scope of the disclosure.

The first predetermined threshold 306 and the second predetermined threshold 308 may correspond to the vehicle parameter, as described in FIG. 1. For example, the first predetermined threshold 306 may be 20% output power of the engine of the vehicle 102 and the second predetermined threshold 308 may be 80% output power of the engine of the vehicle 102. The meter output 302 may correlate with the excitement and/or emotion level of the driver of the vehicle 102. In some embodiment, the percentage output power 304 may correspond to the first value of the vehicle parameter received either from the in-vehicle sensors 208, the ECU 210, or the memory 202. The emotional level curve 310 may match the excitement and/or emotion level of the driver of the vehicle 102, based on driving conditions and the vehicle parameter, for example, the percentage output power 304. The emotional level curve 310 may vary based on change of a value of the percentage output power 304. In an exemplary scenario, the percentage output power 304 may be an output power at wheels of the vehicle 102. In another exemplary scenario, the percentage output power 304 may be an output power of the engine of the vehicle 102. The percentage output power may be calculated by one of the ECU 210 or the control circuitry 106. The operations for the calculation of the percentage output power is described, for example in FIGS. 6 and 9. In some embodiments, the gauge graphic 110 of the display device 108 may change the background color gradient of the scale 112 in correlation with the change in the value of the percentage output power 304 and the characteristics of the graph 300. The display of the gauge graphic 110 is described, for example, in FIGS. 4A-4C and 10A-10F.

The scale 112 of the gauge graphic 110 may include a plurality of regions defined based on each of the first predetermined threshold 306 and the second predetermined threshold 308. The plurality of regions may correspond to different values of the vehicle parameter of the vehicle 102. Based on the driving condition of the vehicle 102, the control circuitry 106 may be configured to calculate the first value of the vehicle parameter, such as, the engine power or relative engine power (for example, the percentage output power 304). Further, the control circuitry 106 may be configured to compare the percentage output power 304 with each of the first predetermined threshold 306 and the second predetermined threshold 308 and determine a corresponding region of the plurality of regions based on the comparison. The control circuitry 106 may be further configured to control the determined region of the plurality of regions to display the background color gradient or the solid color on the gauge graphic 110. The description of the plurality of regions and operations associated with the display of the background color gradient or the solid color based on the percentage output power 304 is described, for example, in FIGS. 4A-4C.

Figure 4A:
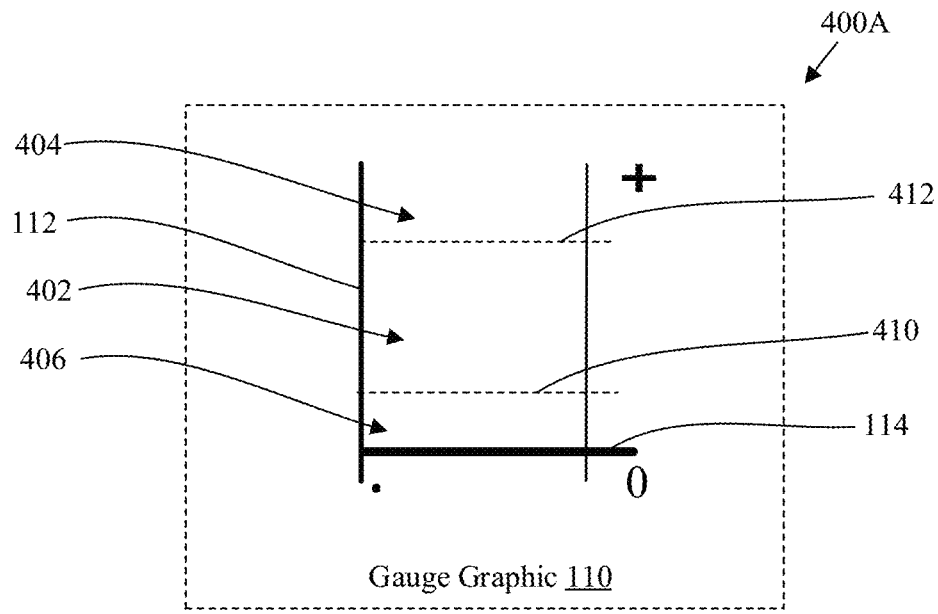
FIGS. 4A, 4B, and 4C collectively illustrate an exemplary scenario for information display by the display system of FIG. 2, in accordance with an embodiment of the disclosure.
Figure 4B:
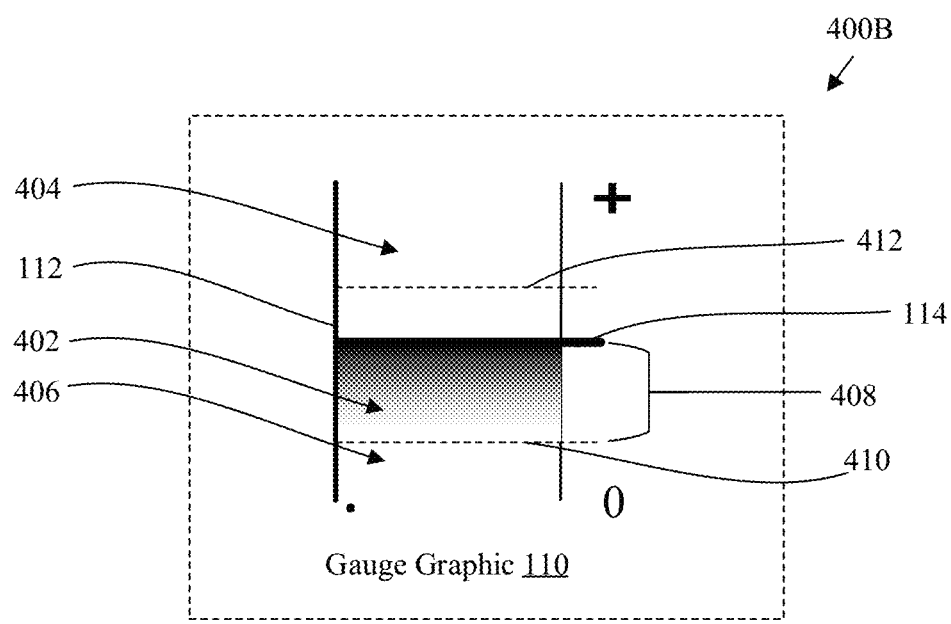
Figure 4C:
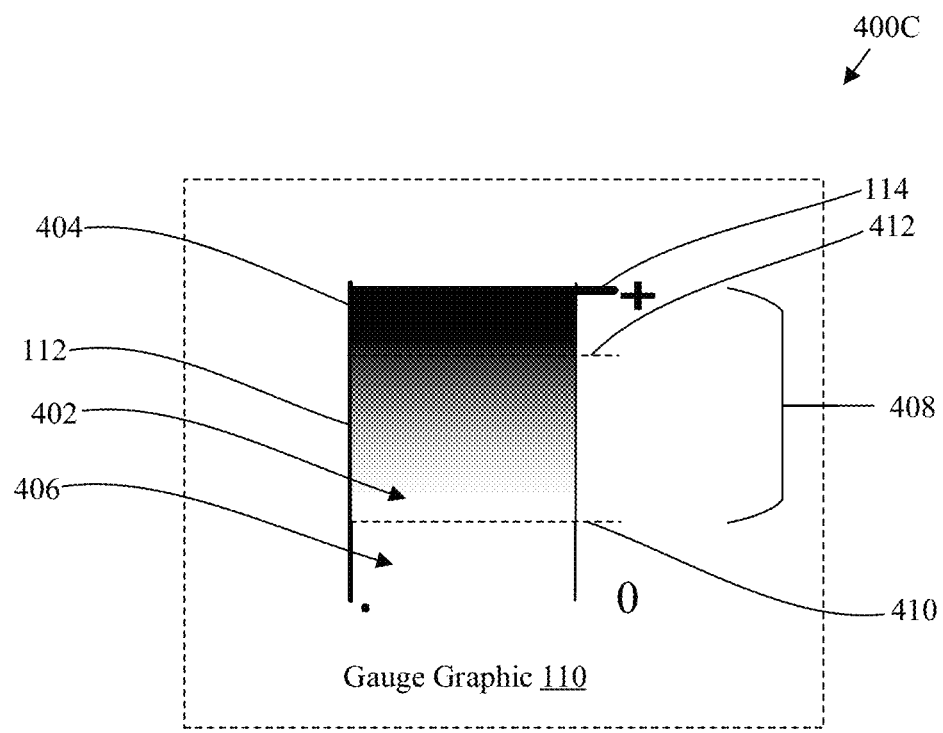

FIGS. 4A, 4B, and 4C collectively illustrate an exemplary scenario for information display by the display system 104 of FIG. 2, in accordance with an embodiment of the disclosure. FIG. 4A is explained in conjunction with elements from FIGS. 1, 2, and 3. With reference to FIG. 4A, there is shown a first scenario 400A that includes the gauge graphic 110. The gauge graphic 110 may include the scale 112 and the needle 114 that may be movable on the scale 112. The gauge graphic 110 may further include one or more first predefined labels (for example a plus sign "+" as shown in FIGS. 4A-4C) at one end of the scale 112. The gauge graphic 110 may further include one or more second predefined labels (for example a dot "." and "0" as shown in FIGS. 4A-4C) at the other end of the scale 112. There is further shown a plurality of regions 402-406 on the gauge graphic 110. The plurality of regions 402-406 may include a first region 402, a second region 404, and a third region 406.

The control circuitry 106 may be configured to move the needle 114 in the plurality of regions 402-406 on the scale 112 based on change in values of the vehicle parameter (for example the relative engine power, the engine power, or the percentage output power 304). The movement of the needle 114 in the plurality of regions 402-406 of the scale 112 may indicate the plurality of driving conditions associated with the vehicle 102 and emotion modes associated with the driver of the vehicle. The emotion modes may correspond to the excitement or emotional level of the driver while driving the vehicle 102. Further, the plurality of regions 402-406 of the scale 112 may be associated with a first scale threshold 410 and a second scale threshold 412. In some embodiments, the first scale threshold 410 and the second scale threshold 412 associated with the scale 112 may correspond to the first predetermined threshold 306 and the second predetermined threshold 308 associated with the vehicle parameter as described in FIG. 3. In accordance with an embodiment, the first scale threshold 410 and the second scale threshold 412 may be calculated based on the conversion of the values of the first predetermined threshold 306 and the second predetermined threshold 308 to threshold values associated with the scale 112 or the meter output 302. For example, in case the first predetermined threshold 306 of the vehicle parameter (for example engine power) is 20% of the maximum vehicle parameter, then the first scale threshold 410 may be 20% of maximum size of the scale 112. Thus, in case the first value is below first predetermined threshold 306 of the vehicle parameter, then the meter output 302 or the needle 114 may be within the first scale threshold 410. Similarly, in case the first value of the vehicle parameter is above the second predetermined threshold 308 (for example 80%) of the vehicle parameter, then the meter output 302 or the needle 114 may be above the second scale threshold 412 (i.e., 80% of the size of the scale 112).

Further, the one or more first predefined labels and the one or more second predefined labels may be at different positions on the scale 112. More specifically, the one or more second predefined labels (for example dot "." and "0") may indicate a minimum level of the vehicle parameter on the scale 112 and corresponds to a non-emotional situation or a minimum emotion level of the driver (such as, for park state or idle state of the vehicle 102). The one or more first predefined labels (for example label "+") may indicate a relative maximum level of the vehicle parameter on the scale 112 and corresponds a maximum excitement situation or maximum emotion level of the driver of the vehicle 102. The control circuitry 106 may be configured to display the one or more first predefined labels (for example label "+") at a position on the second region 404 of the plurality of regions 402-406 and display the one or more second predefined labels (for example dot "." and the "0") at a position on the third region 406 of the plurality of regions 402-406.

In accordance with an embodiment, the first region 402 of the plurality of regions 402-406, as shown in FIG. 4A, of the gauge graphic 110 may correspond to the first value of the vehicle parameter (i.e., engine power or relative engine power or the percentage output power 304) that may be more than the first predetermined threshold 306 and less than the second predetermined threshold 308. Further, the first region 402 may correspond to an intermediate excitement situation or a medium emotion level of the driver of the vehicle 102. The first region 402 is described further, for example, in FIG. 4B.

The second region 404, as shown in FIG. 4A, of the gauge graphic 110 may correspond to the first value of the vehicle parameter (i.e., engine power or relative engine power or the percentage output power 304) that may be more than the second predetermined threshold 308 or the second scale threshold 412. The second region 404 may correspond to a high excitement situation or a high emotion level of the driver of the vehicle 102. The second region 404 may be described further, for example, in FIG. 4C.

Further, the third region 406 may correspond to the first value of the vehicle parameter (i.e., engine power or the relative engine power or the percentage output power 304) that may be less than the first predetermined threshold 306 or the first scale threshold 410. The third region 406 may correspond to a low excitement situation or a low emotion level of the driver of the vehicle 102.

In an exemplary embodiment, the control circuitry 106 may be configured to control the display of a blank background (i.e., no shading) on the third region 406 based on a determination that the first value of the vehicle parameter (for example the engine power) is less than the first predetermined threshold 306. The blank background in the third region 406 may be displayed to deemphasize the vehicle parameter, so as to avoid drawing the attention of the driver to the gauge graphic 110. Accordingly, the control circuitry 106 may be further configured to also control the display of the blank background in the first region 402 and the second region 404 based on the determination that the first value of the vehicle parameter (for example the engine power) is less than the first predetermined threshold 306.

In an exemplary embodiment, when the vehicle 102 is started in a neutral state, an idle state, or a park state, the control circuitry 106 may be configured to receive the first value of the vehicle parameter (e.g., engine power) from the ECU 210 or the in-vehicle sensors 208 of the vehicle 102. The details of calculation of the first value of the vehicle parameter is described further, for example, in FIGS. 6 and 9. The control circuitry 106 may be further configured to compare the received first value of the vehicle parameter with each of the first predetermined threshold 306 and the second predetermined threshold 308. In accordance with an embodiment, the control circuitry 106 may further determine whether the first value of the vehicle parameter is less than each of the first predetermined threshold 306 and the second predetermined threshold 308. In response to the determination that the first value of the vehicle parameter is less than the first predetermined threshold 306, the control circuitry 106 may be further configured to display the blank background (i.e., no shading) in each of the plurality of regions 402-406 in accordance with the low excitement or emotional level of the driver of the vehicle 102 during the neutral state, the idle state or the park state. For example, in such states, the engine of the vehicle 102 may produce the low power which may be less than the first predetermined threshold 306. Therefore, the displayed blank background on each of the plurality of regions 402-406, may reflect to the low excitement or emotional level of the driver of the vehicle 102. Further, the control circuitry 106 may be further configured to control the display of the gauge graphic 110 in a manner such that a linear movement (for example vertical movement) of the needle 114 may be controlled in the third region 406 of the scale 112 based on the determination that the first value of the vehicle parameter is less than the first predetermined threshold 306.

In an embodiment, the first value of the vehicle parameter may be determined to be less than the first predetermined threshold 306, when the vehicle 102 may be in the idle state. The idle state of the vehicle 102 may correspond to various situations, for example, when vehicle 102 may be parked, or when the vehicle 102 may be stopped, or a situation in which the vehicle 102 may be in the neutral gear position. In another embodiment, the first value of the vehicle parameter may be determined to be less than the first predetermined threshold 306 even though an accelerator pedal of the vehicle 102 is being pushed, such as in a situation when the vehicle 102 may be cruising at a steady speed, or a situation in which the vehicle 102 may be moving at a low speed. In such situations, the gauge graphic 110 may move the needle 114 up and down on the third region 406 in correspondence with the first value of the vehicle parameter, but may display the blank background in each of the plurality of regions 402-406 to deemphasize the vehicle parameter, so as to avoid drawing the attention of the driver to the gauge graphic 110.

In an example, the engine of the vehicle 102 is ON, but the vehicle 102 may not be moving like when the vehicle 102 may be stationary at a red light. The control circuitry 106 may be configured to receive the vehicle parameters, for example, the engine power, the gear position, a status of the clutch (such as engaged or disengaged), the acceleration, and the like from the in-vehicle sensors 208 or the ECU 210 and further determine the driving condition of the vehicle as in the idle state based on the vehicle parameters. In such situation, the first value of the vehicle parameter may be less than the first predetermined threshold 306, due to which the control circuitry 106 may control the gauge graphic 110 to display the blank background on each of the plurality of regions 402-406 as shown in FIG. 4A.

With reference to FIG. 4B, there is shown a second scenario 400B that includes the gauge graphic 110. The gauge graphic 110 in the second scenario 400B is similar to the gauge graphic 110 in the first scenario 400A. The description of the gauge graphic 110 in the second scenario 400B has been omitted from the disclosure for the sake of brevity. In FIG. 4B, there is further shown the background color gradient 408 (i.e., gradual shading variation in predefined one or more colors) in the first region 402 of the scale 112.

In a case where the vehicle 102 is in motion and the gauge graphic 110 may control the display of the needle 114 in the third region 406 as described in FIG. 4A, the control circuitry 106 may be further configured to compare the received first value of the vehicle parameter (for example the engine power, relative engine power) with each of the first predetermined threshold 306 and the second predetermined threshold 308. The control circuitry 106 may be configured to determine whether the first value of the vehicle parameter is more than the first predetermined threshold 306 and less than the second predetermined threshold 308.

In response to the determination, the control circuitry 106 may be further configured to move the position of the needle 114 towards the first region 402 of the scale 112. For the movement of the needle 114, the control circuitry 106 may be configured to determine a position of the needle 114 on the scale 112 within the first region 402 based on the first value of the vehicle parameter. Based on the determined position of the needle 114 within the first region 402, the control circuitry 106 may be further configured to control the display device 108 to move the needle 114 to the determined position on the displayed gauge graphic 110 (for example from the third region 406 to the first region 402).

The control circuitry 106 may be further configured to display the background color gradient 408 in the first region 402 based on the first value of the vehicle parameter as shown in FIG. 4B. Accordingly, the control circuitry 106 may be configured to display the background color gradient 408 in the first region 402 in accordance with the position of the needle 114 within the first region 402 of the scale 112. The control circuitry 106 may be further configured to display the background color gradient 408 from a first end of the first region 402 closer to the third region 406 up to the position of the needle 114 in the first region 402, and may display the blank background in the remaining part of the first region 402, i.e., from the position of the needle 114 to a second end of the first region 402 closer to the second region 404, as shown in FIG. 4B. The gauge graphic 110 may display the background color gradient 408 in the first region 402 to emphasize the vehicle parameter (e.g., engine power) and to attract the attention of the driver in certain driving conditions, such as, rapid acceleration, in accordance with the sound of the engine of the vehicle 102. For example, the gauge graphic 110 may display the background color gradient 408 in the first region 402 for a range of values of the engine power between 20% throttle and 80% throttle. In another example, the gauge graphic 110 may display the background color gradient 408 in the first region 402 based on the determination that the first value of the vehicle parameter is between the first predetermined threshold 306 and the second predetermined threshold 308 of the vehicle parameter. Thus, background color gradient 408 (or increasing shading) of the gauge graphic 110 matches the increasing emotional or excitement level of the driver of the vehicle 102 in correspondence with the sound of the engine throttling or acceleration of the vehicle 102, and thereby increases the excitement level of the driver of the vehicle 102. For example, with rapid increase in acceleration due to pressing of an accelerator of the vehicle 102, the increase in shading or the displayed background color gradient 408 in the first region 402 may match or reflect the increase in the emotional or excitement level of the driver of the vehicle 102.

The background color gradient 408 in the gauge graphic 110 may correspond to variation of a predefined color (such as, shades of the predefined color) at different positions within the first region 402 of the scale 112, based on the measured first value of the vehicle parameter (for example the engine power). Further, as shown in FIG. 4B, the control circuitry 106 may be configured to display the background color gradient 408 on a first part of the first region 402, based on the comparison of the first value of the vehicle parameter with the first predetermined threshold 306 and the second predetermined threshold 308. In an embodiment, the background color gradient 408 may indicate a variation of single or one predefined color. The control circuitry 106 may be configured to vary the background color gradient 408 of the single predefined color or move the needle 114 within the first part of the first region 402 based on the change in the first value of the vehicle parameter.

In some embodiments, the background color gradient 408 on the first region 402 may indicate variation of multiple predefined colors that may be different from each other. In such embodiments, a first color may be displayed close to the first end of the first region 402, and a second color (different from the first color) may be displayed close to the second end of the first region 402. For example, as shown in FIG. 4B, the first color may be white and the second color may be black. It may be noted the white color as the first color and the black color as the second color is presented in FIG. 4B merely as an example. The present disclosure may be also applicable to other shades of color palettes, without a deviation from scope of the disclosure. For example, the first color may be black and the second color may be white.

In accordance with an embodiment, the control circuitry 106 may be configured to vary the displayed background color gradient 408 and the displayed blank background in the plurality of regions 402-406 based on a change in the received first value of the vehicle parameter. The control circuitry 106 may be configured to continuously receive the first value of the vehicle parameter from the ECU 210 (or the in-vehicle sensors 208), to continuously control the variation in the displayed background color gradient 408 and the position or movement of the needle 114 on the scale 112.

In particular, the control circuitry 106 may be further configured to receive the vehicle parameters, for example, the status of the clutch (such as engaged or disengaged), the engine output power, the acceleration and the like, from the in-vehicle sensors 208 or the ECU 210 and further determine the driving condition of the vehicle 102 corresponding to the emotional or excitement level of the driver based on the received vehicle parameters. In certain situations, the driver of the vehicle 102 may snap (abruptly press) the accelerator pedal or the throttle in the neutral state or the park state. Although the vehicle 102 may not be moving in such situation, the gauge graphic 110 may move the needle 114 up the scale 112 and display the background color gradient 408 in the first region 402 to match the engine power, sound of the engine of the vehicle 102, and the emotional or excitement level of the driver with the press of the accelerator pedal. For example, as the sound of the engine may increase due to the changed value of the engine power or due to the abrupt press of the accelerator pedal, the needle 114 on the scale 112 may move in an upward direction and accordingly the background color gradient 408 may be changed gradually in the first region 402 in the gauge graphic 110 in order to match or reflect the increase in the emotional or excitement level of the driver with his/her interaction with the vehicle 102. Thus, the disclosed display system 104 facilitates the driver of the vehicle 102 to observe changes in the measured vehicle parameters in accordance with the plurality of emotion modes of the driver and the driving conditions, by the display of the gauge graphic 110.

With reference to FIG. 4C, there is shown a third scenario 400C that includes the gauge graphic 110. The gauge graphic 110 in the third scenario 400C is similar to the gauge graphic 110 in the first scenario 400A and the second scenario 400B. The description of the gauge graphic 110 in the third scenario 400C has been omitted from the disclosure for the sake of brevity. In FIG. 4C, there is further shown in the gauge graphic 110 of the third scenario 400C that each of the first region 402 and the second region 404 includes the background color gradient 408.

In a case where the vehicle 102 may be moving and the gauge graphic 110 may be displayed on the display device 108 as shown in FIG. 4B (the background color gradient 408 on the first region 402 of the gauge graphic 110), the control circuitry 106 may be further configured to continuously receive the first value of the vehicle parameter from the ECU 210 or the in-vehicle sensors 208 (as described, for example, in FIG. 4B) and compare the first value of the vehicle parameter with the first predetermined threshold 306 and the second predetermined threshold 308.

The control circuitry 106 may be configured to receive vehicle parameters that may include, but not limited to, the value of the engine output power, the status of engagement of the clutch, a value of the gear ratio, and/or the acceleration from the one of in-vehicle sensors 208 or the ECU 210 and calculate or determined the first value of the vehicle parameter based on received vehicle parameters. The detailed operation for calculation of the first value of the vehicle parameter may be explained further, for example, in FIG. 6. The control circuitry 106 may be further configured to determine whether the calculated first value of the vehicle parameter exceeds the second predetermined threshold 308. Based on the determination that the first value of the vehicle parameter exceeds the second predetermined threshold 308, the control circuitry 106 may determine that the first value of the vehicle parameter may correspond to the second region 404 of the scale 112. The control circuitry 106 may be further configured to determine a position of the needle 114 on the scale 112 in the second region 404 based on the first value of the vehicle parameter. The control circuitry 106 may be configured to move the needle 114 on the scale 112 based on the determined position in the second region 404. For example, in case the first value is 90% of the engine power (or the percentage output power 304) which is the more than the second predetermined threshold 308 (for example 80%), the control circuitry 106 may move the needle 114 within the second region 404 (above the second scale threshold 412) based on the first value of the vehicle parameter (for example the engine power).

In accordance with an embodiment, the control circuitry 106 may be further configured to extend the displayed background color gradient 408 from the first region 402 to the second region 404 based on the determination that the first value of the vehicle parameter exceeds the second predetermined threshold 308 as shown in FIG. 4C. The background color gradient 408 may be extended to the second region 404 such that a solid color may be displayed on the second region 404. More specifically, the variation of the predefined color (or shading) of the first region 402 and the solid color of the second region 404 may be displayed in such a way that the shading or gradient of the predefined color may start from the first region 402 and may gradually become the solid color at or near the second region 404. In case of multiple predefined colors used in the background color gradient 408, the solid color may be the second color of the background color gradient 408. For example, as shown in FIGS. 4B and 4C, the solid color displayed in the second region 404 is the second color of the background color gradient 408 displayed in the first region 402, which is the black color, as an example.

In an exemplary scenario, when the press of the acceleration pedal of the vehicle 102 increases such that a throttle of the engine may be wide open, there may rapidly increase in the output power (or the percentage output power 304) of the vehicle 102. In such case, the control circuitry 106 may be configured to receive the value of the engine power, information indicating the clutch engagement status, and a value of the pressure on the acceleration pedal from the one of in-vehicle sensors 208 or the ECU 210. The control circuitry 106 may be further configured to determine that the first value of the vehicle parameter (for example the engine power) exceeds the second predetermined threshold 308. In such scenarios, the control circuitry 106 may be further configured to extend the displayed background color gradient to the solid color in the second region 404. The extended background color gradient 408 as the solid color at the second region 404 (as shown in FIG. 4C) may match or reflect the high (or maximum) excitement or emotional level of the driver in accordance with the high engine sound and/or high speed of the vehicle 102 based on the vehicle driving condition of wide open throttle (WOT).

In accordance with an embodiment, the control circuitry 106 may be configured to determine the driving condition of the vehicle 102 based on, but is not limited to, the status of the clutch engagement, the output power, and/or the pressure on the acceleration pedal. The control circuitry 106 may be configured to determine, that the position of the needle 114 may correspond to the second region 404 of the scale 112, based on the determined driving condition or the determination that the first value of the vehicle parameter (i.e., engine power) exceeds the second predetermined threshold 308. Further, based on the determination, the control circuitry 106 may be configured to move the needle 114 on the scale 112 from the first region 402 to the determined position in the second region 404 along with the extension of the displayed background color gradient 408 from the first region 402 to the determined position of the needle 114 in the second region 404 of the scale 112. The solid color (of the background color gradient 408) in the second region 404 may reflect the high throughput of the engine or the vehicle 102 during different driving conditions (for example the wide-open throttle). Thus, with respect to FIGS. 4A-4C, the disclosed display system 104 facilitates the display of the engine power (or other vehicle parameters), via the gauge graphic 110, which correlates with the driving conditions of the vehicle (engine sound, acceleration, speed, etc.), and with the excitement or emotional level of the driver. Thus, a man-machine synergy effect is achieved based on the display system 104 of the vehicle 102.

FIG. 5 illustrates a table indicating exemplary scenarios for providing information display, in accordance with an embodiment of the disclosure. FIG. 5 is explained in conjunction with elements from FIGS. 1, 2, 3, and 4A-4C. With reference to FIG. 5, there is shown a table 500 indicating different exemplary scenarios with respect to driving the vehicle 102. The first column of the table 500 corresponds to driver input 502, the second column corresponds to sensory feedback 504 of various components of the vehicle 102, and the third column corresponds to meter indications 506. In the table 500, there is further shown a column as a judgment 530. The judgment 530 column may indicate a result of an association between the driver input 502, the sensory feedback 504, and the meter indications 506.

The driver input 502 may include driving scenario information 510 and accelerator pedal information 512. The accelerator pedal information 512 may be associated with an amount of pressure exerted by the driver on the accelerator pedal of the vehicle 102. The accelerator pedal information 512 may indicate state of the accelerator pedal with respect to the throttle, for example, light throttle, wide open throttle, throttle off, and the like. The sensory feedback 504 may indicate a response or a feedback from the components of the vehicle 102 such as the accelerator pedal, the engine, and the like. The sensory feedback 504 may include information associated with the response or the feedback, for example, an acceleration feeling information 514 and engine sound 516. The engine sound 516 in FIG. 5 may further include a tone/pitch 518 and a sound level 520. Further, there is shown that the meter indications 506 which may include information such as G-meter 522, tach 524, vehicle speed 526, power meter 528.

The memory 202 may be configured to store information which may indicate the association between the driver input 502, the sensory feedback 504, and the meter indications 506 for different driving conditions as shown in the table 500. For example, when the vehicle 102 accelerates at $1^{st}$ gear with wide-open throttle (WOT) due to the driver input, an accelerator pedal of the vehicle 102 may indicate the acceleration feeling 514 as "high acceleration G". Accordingly, the tone/pitch 518 and the sound level 520 may increase due to high acceleration. Further, the G-meter 522 associated with an output on an accelerometer of the vehicle 102 may indicate high acceleration G in response to the wide-open throttle (WOT) driving condition, which matches the driver feeling expectation. Further, due to the high acceleration, a speed and sound of each of the engine and the vehicle 102 may increase. Accordingly, the tach 524 associated with the output of a tachometer of the vehicle 102 may indicate increasing engine rotational speed, which matches the driver sound expectation; the vehicle speed 526 associated with the speedometer 118 may indicate increasing vehicle speed, which matches the driver sound expectation; and the power associated with the gauge graphic 110 may indicate increasing power, which matches the driver sound and feeling expectations.

Several other driving scenarios or conditions, such as, low rotational engine speed when cruise (deceleration), cruise (acceleration), and paddle shifting; high engine rotational speed when paddle shifting, slow creep, idle snap, and engine off are shown in the table 500 along with corresponding values in other columns, such as, the accelerator pedal information 512, the acceleration feeling information 514, the engine sound 516, the G-meter 522, the tach 524, the vehicle speed 526, and the power meter 528. Further, the association between the driver input 502, the sensory feedback 504, and the meter indications 506 may be the output given by different components of the vehicle 102, such as the in-vehicle sensors 208, the gauge graphic 110, the speedometer 118, and other output devices. The association may be output on a plurality of vehicle parameter indicators, such as the gauge graphic 110, the speedometer 118, the tachometer, the accelerometer, and the like. Thus, the display system 104 facilitates output on the display device 108 in accordance with the association stored in the memory 202 such that the display of the gauge graphic 110 may be in alignment with vehicle parameters of the vehicle 102.

Figure 6:
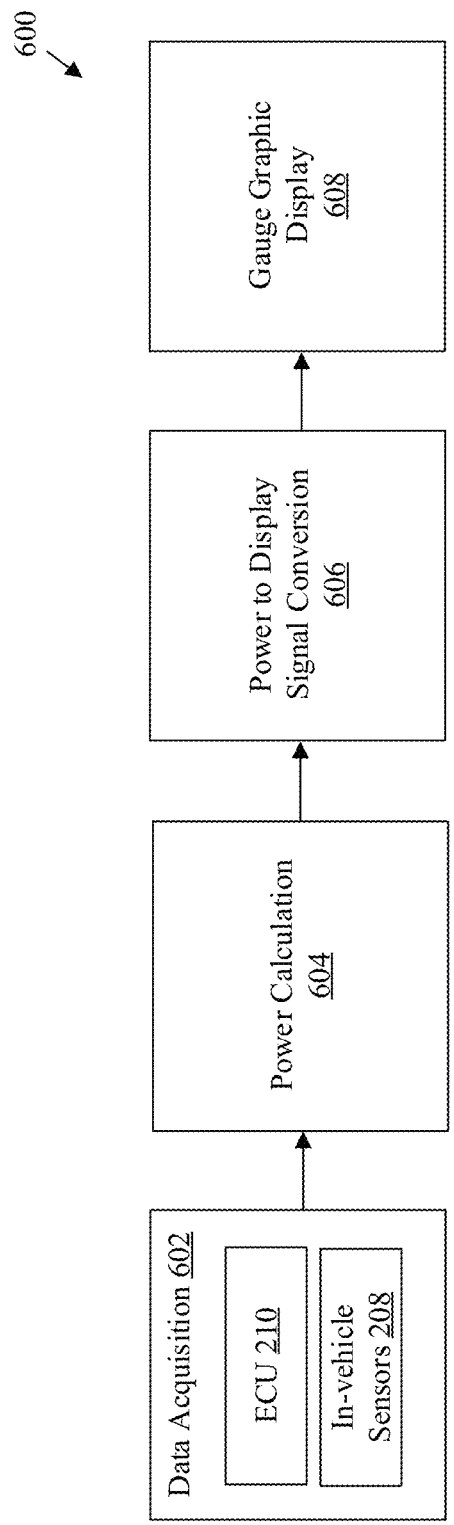
FIG. 6 is a diagram that illustrates exemplary operations of a display system of FIG. 2, in accordance with an embodiment of the disclosure.

FIG. 6 is a diagram that illustrates exemplary operations of a display system of FIG. 2, in accordance with an embodiment of the disclosure. FIG. 6 is explained in conjunction with elements from FIGS. 1, 2, 3, 4A-4C, and 5. With reference to FIG. 6, there is shown a block diagram 600 that illustrates a set of operations 602-608 to depict acquisition of the vehicle parameter, calculation of the engine power, conversion of the calculated engine power to a display signal, and display of the gauge graphic 110 on the display device 108 based on the display signal. The display signal (or a display value) may correspond to the display of the blank background, the background color gradient 408, or the solid color on the plurality of regions 402-406 as described, for example, in FIGS. 4A-4C.

At 602, the ECU 210 of the vehicle 102 may be configured to execute data acquisition operation. When the vehicle 102 is in ON state and/or moving state, the ECU 210 may be configured to acquire the vehicle parameters of the vehicle 102 from the in-vehicle sensors 208. The vehicle parameters may include, but are not limited to, a torque on the wheels as a wheel torque, radii of the wheels of the vehicle 102, and a speed of movement of the vehicle. A plurality of values associated with the vehicle parameters may be based on various driving conditions associated with the vehicle 102. In some embodiments, the plurality of vehicle parameters may further include the gear ratio, a position of the gear, or the engine torque. The control circuitry 106 may be further configured to calculate the wheel torque based on the gear ratio and the engine torque. The memory 202 may be configured to store the plurality of vehicle parameters, a value of catalog maximum power, and values associated with each of atmospheric pressure correction (PA) and ambient temperature correction (TA). The value of the catalog maximum power and the values associated with each of the atmospheric pressure correction (PA) and the ambient temperature correction (TA) may correspond to predefined values associated with the vehicle 102. In some embodiments, the control circuitry 106 of the display system 104 may be configured to execute the data acquisition operation at step 602. The control circuitry 106 may be configured to acquire the plurality of vehicle parameters, the value of catalog maximum power, and the values associated with each of atmospheric pressure correction (PA) and ambient temperature correction (TA) from the in-vehicle sensors 208, the ECU 210, and/or the memory 202.

At 604, the ECU 210 or the control circuitry 106 may be configured to calculate engine power (or for example as relative engine power). The control circuitry 106 may be configured to calculate a tractive force of the vehicle 102 based on the wheel torque of the vehicle 102 and the radii of the wheels of the vehicle 102 as shown in equation (1):

Tractive force=wheel torque*wheel radius    equation (1).

Further, the ECU 210 or the control circuitry 106 may be further configured to calculate a vehicle power of the vehicle 102 based on the calculated tractive force of the vehicle 102 (described in equation (1)) and the received vehicle speed, as shown in equation (2):

Vehicle power=tractive force*vehicle speed    equation (2).

The ECU 210 or the control circuitry 106 may be further configured to receive the value of catalogue maximum power (i.e., catalogue max power) and the values associated with each of the atmospheric pressure correction (PA) and the ambient temperature correction (TA) from the memory 202. The ECU 210 or the control circuitry 106 may be further configured to compute maximum available power (max available power) of the vehicle 102 based on the received values of the catalog max power, the PA correction, and the TA correction as shown in equation (3):

Max available power=catalog max power*(PA and TA correction)   equation (3)

The ECU 210 or the control circuitry 106 may be further configured to determine the first value of the engine power (i.e., percentage output power 304 or the relative engine power) of the vehicle 102 based on the vehicle power (calculated in equation (2)) and the max available power (calculated in equation (3)) as shown in equation (4) below:

Percentage output power 304=vehicle power/max available power   equation (4).

The percentage output power 304 may correspond to the relative engine power or the engine power to be displayed by the gauge graphic 110. For example, the percentage output power may indicate power at the wheels of the vehicle 102 or that may be received by the wheels from the engine of the vehicle 102 via a communication system of the vehicle 102. In some embodiments, the control circuitry 106 of the display system 104 may be configured to directly receive the percentage output power 304 or the engine power (as the first value of the vehicle parameter) from the ECU 210.

At 606, the control circuitry 106 of the display system 104 may be configured to execute conversion of the first value of the vehicle perimeter (i.e., the percentage output power 304, the engine power, or the relative engine power) into the display signal which may be associated with the scale 112 of the gauge graphic 110. The control circuitry 106 may be configured to acquire the first value of the vehicle perimeter from the ECU 210. In some embodiments, the first value of the vehicle parameter may be calculated by the control circuitry 106 of the display system 104 as described, for example, in step 604. Further, the control circuitry 106 may be configured to compare the value of the engine power with predetermined thresholds (for example, the first predetermined threshold 306 and the second predetermined threshold 308). The details of the operations associated with the comparison of the value of the engine power with the predetermined thresholds are described, for example, in FIGS. 3 and 4A-4C. The control circuitry 106 may be further configured to convert the received or calculated first value of the vehicle parameter (for example the percentage output power 304) into the display signal of the gauge graphic 110. In particular, the control circuitry 106 may be configured to convert the first value in accordance with readings of the scale 112 of the gauge graphic 110. For conversion, the control circuitry 106 may map the first value into the plurality of regions 402-406 of the scale 112. The control circuitry 106 may compare the received or calculated first value with the first predetermined threshold 306 and the second predetermined threshold 308 to identify the plurality of regions 402-406 for display of the display signal as described, for example, in FIGS. 4A-4C. For example, in case the first value is 30% and the first predetermined threshold 306 may be 20%, the display signal may correspond to the first region 402 and accordingly, the gauge graphic 110 may display the background color gradient 408 on the first region 402 based on the first value and the converted display signal as described, for example, in FIG. 4B. In another example, in case, the first value is 90% and the second predetermined threshold 308 may be 80%, the display signal may correspond to the second region 404 and accordingly, the gauge graphic 110 may display the background color gradient 408 on the first region 402 (between the first scale threshold 410 and the second scale threshold 412) and the solid color on the second region 404 (above the second scale threshold 412) based on the first value and the converted display signal as described, for example, in FIG. 4C. The control circuitry 106 may be configured to control the movement or the position of the needle 114 on the scale 112 based on the converted display signal corresponded with the scale 112 of the gauge graphic 110.

At 608, the control circuitry 106 may be configured to execute display of the gauge graphic 110. The control circuitry 106 may be configured to display the gauge graphic 110 on the display device 108 based on the conversion of the first value of the vehicle parameter (i.e., engine power or the percentage output power 304) to the display signal. The display of the gauge graphic 110 based on the first value is described, for example, in FIGS. 4A-4C.

Figure 7:
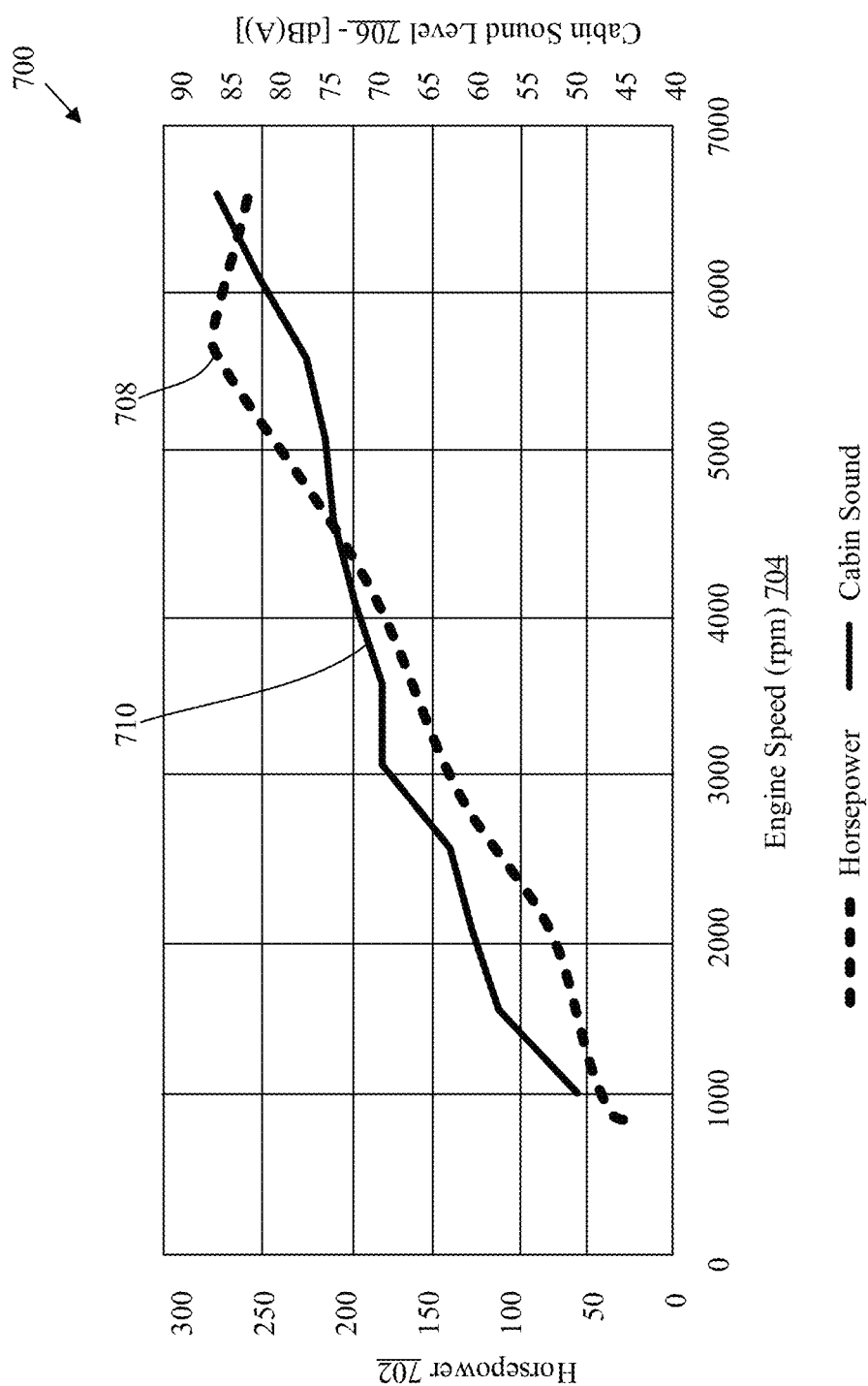
FIG. 7 illustrates a graph to indicate a relationship between engine power, cabin sound level, and an engine speed, in accordance with an embodiment of the disclosure.

FIG. 7 illustrates a graph to indicate a relationship between engine power, cabin sound level, and an engine speed, in accordance with an embodiment of the disclosure. FIG. 7 is explained in conjunction with elements from FIGS. 1, 2, 4A-4C, 5, and 6. With reference to FIG. 7, there is shown a graph 700 that indicate horsepower 702 in association with an engine speed (rpm) 704 of the engine, and a cabin sound level 706 in dB(A). There is further shown a first curve 708 which may indicate a relationship between the horsepower 702 (i.e., engine power) and the engine speed (rpm) 704. In FIG. 7, there is further shown a second curve 710 which may indicate a relationship between the cabin sound level 706 and the engine speed (rpm) 704.

The vehicle 102 may include a powertrain configuration to drive power from the engine to the wheels of the vehicle 102. The powertrain configuration may indicate an arrangement of main components of the vehicle 102 such as the engine, transmission, drive shafts, differentials, and the wheels. These components may be arranged in such a way that the power from the engine may be derived to the wheels. The cabin sound level 706 of the vehicle 102 may be associated with a plurality of factors such as the engine, a type of road surface on which the vehicle 102 may be driven, and an exhaust system of the vehicle 102. When the pressure on the accelerator pedal of the vehicle 102 is increased, the pressure may result in a wide-open throttle (WOT) state of the engine of the vehicle 102 and accordingly, the engine may run at higher RPM and may generate high amount of output power at the wheels of the vehicle. Due to the high RPM of the engine, the engine may generate the cabin sound based on the high RPM. Therefore, the cabin sound level 706 may increase in direct proportion with increase in the horsepower 702 and the engine speed (rpm) 704 as shown in FIG. 7. Therefore, the effect of change in the horsepower 702 (i.e., the percentage output power 304) and the cabin sound level 706 in direct proportion with the engine speed (rpm) 704, shown in the graph 700, illustrates that the engine power may be suited for implementation of the display of the gauge graphic 110 in alignment with the excitement or emotional level of the driver and the driving conditions of the vehicle 102. The details of display of the gauge graphic may be described, for example, in FIGS. 4A-4C.

Figure 8:
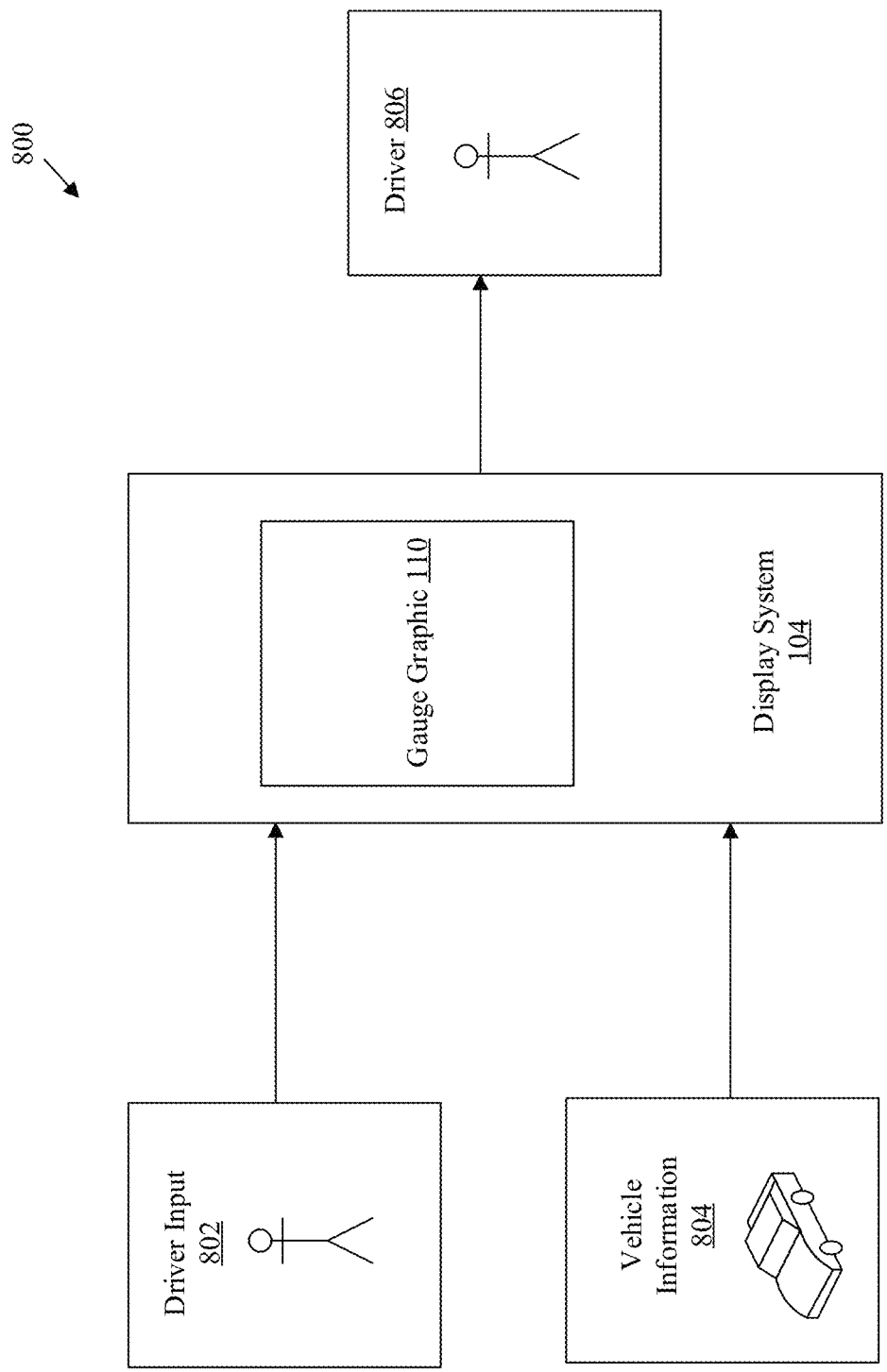
FIG. 8 illustrates a block diagram to indicate a relationship between a driver input, vehicle information, and a display system of FIG. 2 for information display, in accordance with an embodiment of the disclosure.

FIG. 8 illustrates a block diagram to indicate a relationship between a driver input, vehicle information, and a display system of FIG. 2 for information display, in accordance with an embodiment of the disclosure. FIG. 8 is explained in conjunction with elements from FIGS. 1, 2, 3, 4A-4C, 5, 6, and 7. With reference to FIG. 8, there is shown a block diagram 800 to depict acquisition of driver input 802, and vehicle information 804 and display of the gauge graphic 110 to the driver based on the driver input 802 and the vehicle information 804.

In case, the pressure is applied on the accelerator pedal of the vehicle 102, the in-vehicle sensors 208 may be configured to detect an accelerator pedal amount, for example, wide open throttle. Further, the in-vehicle sensors 208 may be configured to acquire the vehicle information 804, for example, the vehicle speed, the gear position, powertrain information, the powertrain conditions, and the like. The powertrain information may include the ambient temperature and atmospheric pressure. The powertrain conditions may include idle conditions, torque requests, torque limits, and the like. The control circuitry 106 of the display system 104 may be configured to receive the accelerator pedal amount and the vehicle information 804 from the in-vehicle sensors 208.

Further, based on the received accelerator pedal amount and the vehicle information 804, the control circuitry 106 may be configured to determine the first value of the vehicle parameter (i.e., engine power or the percentage output power 304). The calculation of the first value of the vehicle parameter is described, for example, in FIG. 6. The control circuitry 106 may be further configured to display the gauge graphic 110 based on the calculated first value of the vehicle parameter as described, for example, in FIGS. 4A-4C. Thus, the displayed gauge graphic 110 enables the driver 806 of the vehicle 102 to visualize the performance (i.e., first value of the vehicle parameter) of the components of the vehicle 102 in alignment with emotion modes of the driver while driving the vehicle 102. It should be noted that the display of the gauge graphic 110 may not impact the performance or behavior of the vehicle 102.

Figure 9:
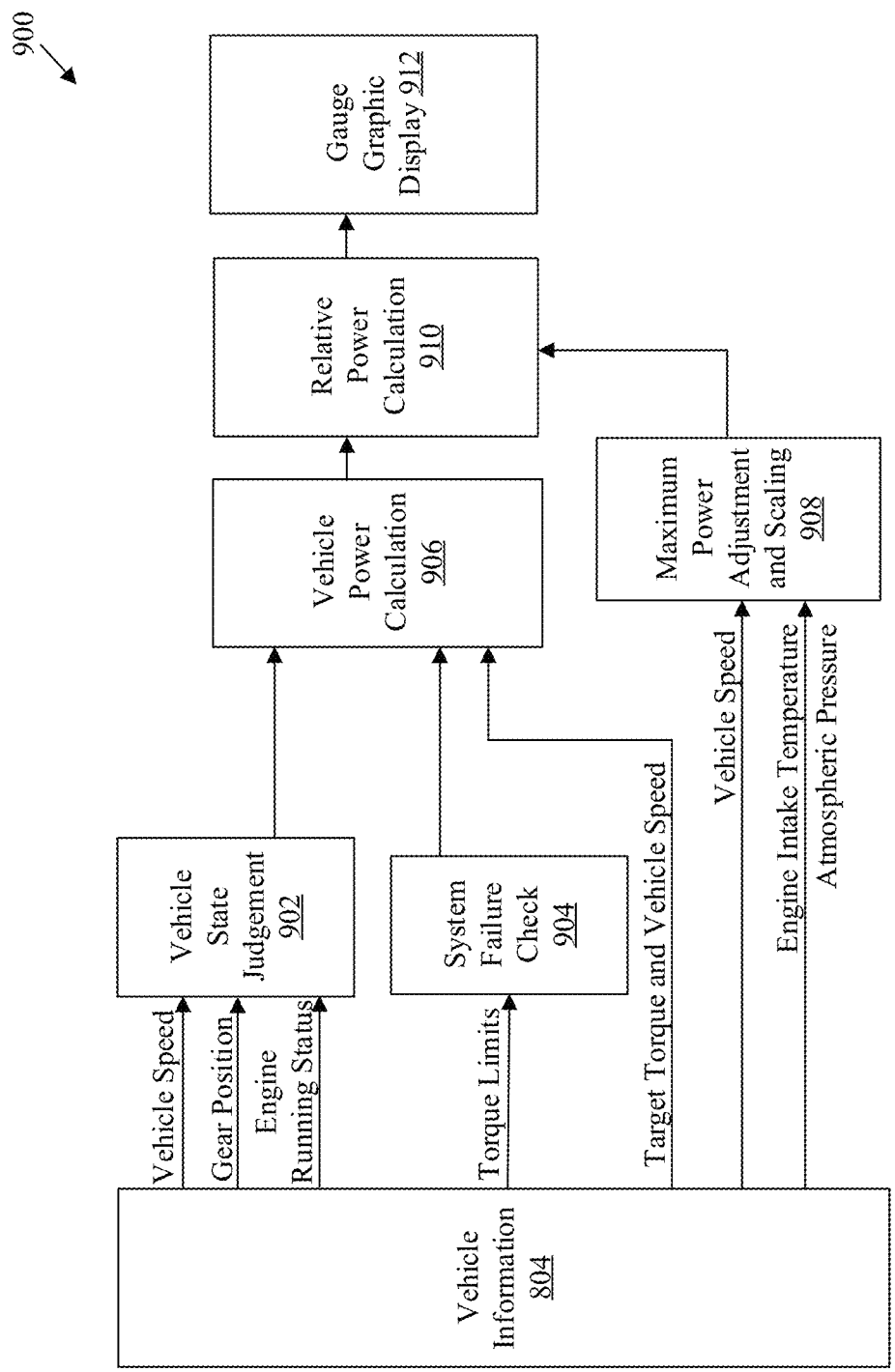
FIG. 9 illustrates an exemplary flow diagram of a display system for information display, in accordance with an embodiment of the disclosure.

FIG. 9 illustrates an exemplary flow diagram of a display system for information display, in accordance with an embodiment of the disclosure. FIG. 9 is explained in conjunction with elements from FIGS. 1, 2, 3, 4A-4C, 5, 6, 7, and 8. With reference to FIG. 9, there is shown a flow diagram 900 to depict a set of operations, for example, a vehicle state judgment, a system failure check, a vehicle power calculation, a relative power calculation, and a display of the gauge graphic 110 on the display device 108 based on the vehicle information 804 described in FIG. 8.

The control circuitry 106 may be configured to acquire the vehicle information 804 from the in-vehicle sensors 208, the ECU 210, or the memory 202. The vehicle information 804 may include, for example, the vehicle speed, the gear position, engine running state, the torque limits, target torques, engine intake temperature (or ambient temperature), atmospheric pressure, and the like.

At 902, the control circuitry 106 may be configured to execute a vehicle state judgment operation. The control circuitry 106 may be configured to determine a state of the vehicle 102 based on, but is not limited to, the vehicle speed, the gear position, and the engine running state. The state of the vehicle 102 may be one of an idle state or a running state.

At 904, the control circuitry 106 may be configured to execute a system failure check operation. In an example, the control circuitry 106 may be configured to check system failure in the vehicle 102 based on the torque limits of the vehicle 102. The torque limits may be acquired by the control circuitry 106 from the memory 202.

At 906, the control circuitry 106 may be configured to calculate vehicle or engine power. The control circuitry 106 may be configured to calculate the vehicle power based on, but is not limited to, the vehicle state, the target torque, and the vehicle speed. The details of the calculation of the vehicle power or the engine power is described, for example, in FIG. 6.

At 908, the control circuitry 106 may be configured to execute maximum power adjustment and scaling operations. The control circuitry 106 may be configured to calculate maximum possible output based on the values of the engine intake temperature (or ambient temperature), the atmospheric pressure, and the vehicle speed. The values of the engine intake temperature (or ambient temperature), the atmospheric pressure, and the vehicle speed may be received from the in-vehicle sensors 208 or the ECU 210.

At 910, the control circuitry 106 may be configured to calculate relative engine power. The control circuitry 106 may be configured to calculate relative engine power based on the calculated vehicle power and the maximum possible output. The relative engine power may correspond to the percentage output power 304 as described, for example, in FIG. 6.

At 912, the control circuitry 106 may be configured to control the display of gauge graphic. The control circuitry 106 may be configured to display the gauge graphic 110 on the display device 108 of the vehicle 102 based on the calculated relative engine power. The details of the display of the gauge graphic 110 based on the calculated relative engine power (i.e., percentage output power 304) is described, for example, in FIGS. 4A, 4B, 4C, and 6.

FIGS. 10A, 10B, 10C, 10D, 10E, and 10F, collectively illustrate exemplary examples for information display by the display system 104 of FIG. 2, in accordance with an embodiment of the disclosure. FIGS. 10A-10F are explained in conjunction with elements from FIGS. 1, 2, 3, 4A-4C, 5, 6, 7, 8, and 9. With reference to FIG. 10A-10F, there is shown a scenario 1000 that indicates the display of the gauge graphic 110 in accordance with change in the vehicle parameter (for example the percentage output power 304, the relative engine power or the engine power). The details of the gauge graphic 110 is similar to the gauge graphic 110 as described in FIGS. 4A-4C. Accordingly, the description of the gauge graphic 110 in the scenario 1000 is omitted for the sake of brevity.

The control circuitry 106 may be configured to continuously receive or calculate the first value of the vehicle parameter as described in FIGS. 4A-4C. Further, the control circuitry 106 may be configured to continuously compare the first value of the vehicle parameter with the first predetermined threshold 306 and the second predetermined threshold 308, and continuously change the display of the gauge graphic 110 on the display device 108 of the vehicle 102. The display of the gauge graphic 110 may be changed such that the needle 114 on the scale 112 may be moved through the plurality of regions 402-406 and the blank background or the background color gradient 408 may be changed (i.e., extended or retracted) in accordance with the movement of the needle 114. The display of the gauge graphic 110 based on the comparison is described, in detail, for example, in FIGS. 4A-4C.

Figures 10A, 10B, 10C, 10D, 10E, 10F:
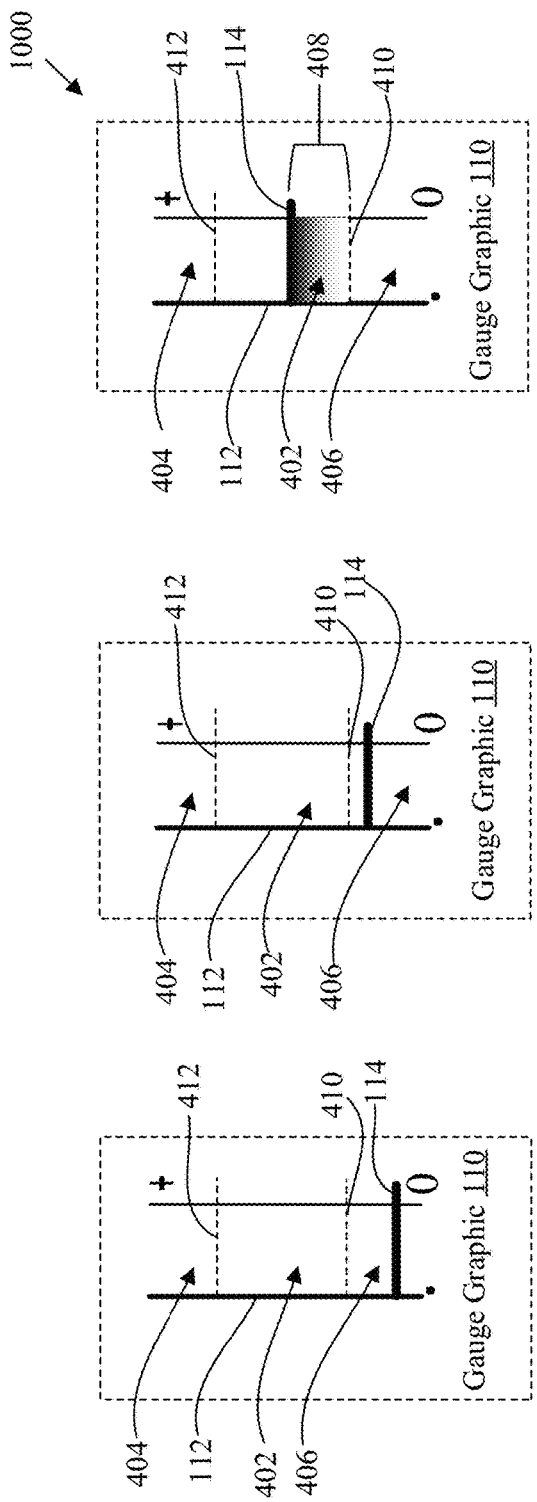
FIGS. 10A, 10B, 10C, 10D, 10E, and 10F, collectively illustrate exemplary examples for information display by the display system of FIG. 2, in accordance with an embodiment of the disclosure.

Specifically, FIG. 10A illustrates the gauge graphic 110 (i.e., displays blank background with needle 114 position in the third region 406 below the first scale threshold 410), for example, when the vehicle 102 is in a slow creep and may correspond to the engine speed at 3% throttle. FIG. 10B illustrates the gauge graphic 110 (i.e., displays blank background with needle 114 position in the third region 406 below the first scale threshold 410), for example, when the vehicle 102 is in a cruise mode and corresponds to the engine speed at 10% throttle, or when the vehicle 102 is in uphill ascent and corresponds to the engine speed at 20% throttle.

FIGS. 10C and 10D illustrate the gauge graphic 110 (i.e., displays background color gradient 408 with needle 114 position in the first region 402), for example, when the vehicle 102 is in acceleration and may correspond to the engine speed at 40-60% throttle. FIG. 10E illustrates the gauge graphic 110 (i.e., displays background color gradient 408 in the first region 402 and the solid color and needle 114 above the second scale threshold 412), for example, when the engine power of the vehicle 102 reaches the second predetermined threshold 308 and corresponds to the engine speed at 80% throttle. FIG. 10F illustrates the gauge graphic 110 (i.e., displays the solid color and the needle 114 at the top of the second region 404 and the background color gradient 408 in the first region 402), for example, when the vehicle 102 is moving at a high speed and corresponds to the engine speed at 100% throttle. Thus, the disclosed display system 104 enables the driver to observe performance of the vehicle 102 in alignment with emotion modes of the driver of the vehicle 102.

FIGS. 11A-11D, collectively, illustrates another exemplary scenario for information display by the display system 104 of FIG. 2, in accordance with another embodiment of the disclosure. FIGS. 11A-11D are explained in conjunction with elements from FIGS. 1, 2, 3, 4A-4C, 5, 6, 7, 8, 9, and 10A-10F. With reference to FIGS. 11A-11D, there is shown a scenario 1100 that indicates another example of gauge graphic 110. The gauge graphic 110 in the scenario 1100 may include a blank background (shown in black color within the third region 406 in FIG. 11A). In an embodiment, the blank background in the third region 406 (e.g., black color), the background color gradient 408 in the first region 402, and the solid color (e.g., white color) in the second region 404 may be referred to as an active area that may be masked by a predefined color (for example grey color shown in FIG. 11A), when the first value of the vehicle parameter may be less than the first predetermined threshold 306 or the needle 114 is below the first scale threshold 410.

In accordance with the embodiment, the control circuitry 106 may be configured to move the needle 114 based on the change in the first value of the vehicle parameter as described in the FIGS. 4A-4C. With respect to FIGS. 11A-11D, the movement of the needle 114 may be configured to unmask the active area as the blank background in the third region 406 in FIG. 11A. In FIGS. 11B and 11C, the movement of the needle 114, with the change in the first value, may unmask the background color gradient 408 as the active area in the first region 402. Similarly, in FIG. 11D, the movement of the needle 114 may unmask the solid color (i.e., white color in FIG. 11D) as the active area in the second region 404.

Figure 12:
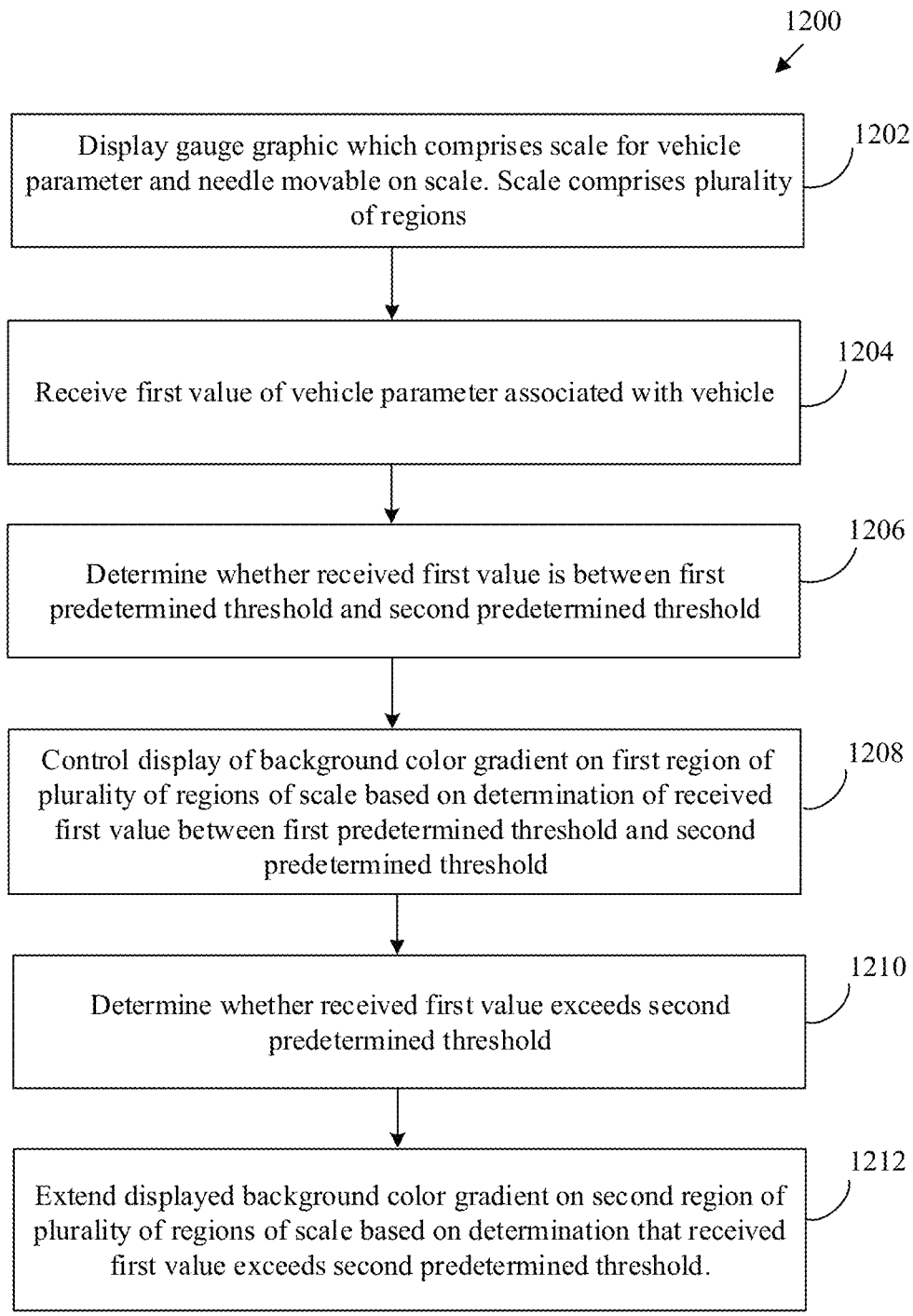
FIG. 12 illustrates a flowchart of an exemplary method for providing information display, in accordance with an embodiment of the disclosure.

FIG. 12 illustrates a flowchart of an exemplary method for providing information display, in accordance with an embodiment of the disclosure. FIG. 12 is explained in conjunction with elements from FIGS. 1, 2, 3, 4A-4C, 5, 6, 7, 8, 9, and 10A-10F. With reference to FIG. 11, there is shown a flowchart 1200 that depicts a method for providing information display. Any computing system, for example, the display system 104 that may include the control circuitry 106 and the display device 108, may execute operations specified in the method. The method illustrated in the flowchart 1200 may start from 1202.

At 1202, the display device 108 may be controlled to display the gauge graphic 110. The gauge graphic 110 may include the scale 112 for the vehicle parameter and the needle 114 movable on the scale 112. Further, the scale 112 may include the plurality of regions 402-406. The display of the gauge graphic 110 is described, for example, in FIGS. 4A-4C, and 10A-10F.

At 1204, the first value of the vehicle parameter associated with the vehicle 102 may be received. The control circuitry 106 may be configured to receive the first value of the vehicle parameter (for example, the relative engine power, the percentage output power 304, or the engine power) from the in-vehicle sensors 208 or the ECU 210 as described, for example, in FIGS. 4A-4C, 6, and 8.

At 1206, whether the received first value is between the first predetermined threshold 306 and the second predetermined threshold 308 may be determined. The control circuitry 106 may be configured to compare the received first value of the vehicle parameter with the first predetermined threshold 306 and the second predetermined threshold 308. Further, based on the comparison, the control circuitry 106 may be configured to determine whether the first value may be between the first predetermined threshold 306 and the second predetermined threshold 308.

At 1208, the display of the background color gradient 408 on the first region 402 of the plurality of regions 402-406 may be controlled based on the determination that the first value is between the first predetermined threshold 306 and the second predetermined threshold 308. The control circuitry 106 may be configured to display the background color gradient 408 on the first region 402 (between the first scale threshold 410 and the second scale threshold 412) of the scale 112 based on the determination that the first value of the vehicle parameter (for example, the value of the relative engine power) is between the first predetermined threshold 306 and the second predetermined threshold 308 as described, for example, in FIG. 4B.

At 1210, whether the received first value exceeds the second predetermined threshold 308 may be determined. The control circuitry 106 may be configured to determine that whether the received first value of the vehicle parameter exceeds the second predetermined threshold as described, for example, in FIG. 4C.

At 1212, the displayed background color gradient 408 may be extended on the second region 404 of the plurality of regions 402-406 based on the determination that the received first value exceeds the second predetermined threshold 308. The control circuitry 106 may be configured to control the gauge graphic 110 to extend the displayed background color gradient 408 to the second region 404 (above the second scale threshold 412) of the plurality of regions 402-406 based on the determination that the received first value of the vehicle parameter exceeds the second predetermined threshold 404 as described, for example, in FIG. 4C. The second region 404 may display the solid color based on the background color gradient 408.

The flowchart 1200 is illustrated as discrete operations, such as 1202, 1204, 1206, 1208, 1210, and 1212. However, in certain embodiments, such discrete operations may be further divided into additional operations, combined into fewer operations, or eliminated, depending on the particular implementation without detracting from the essence of the disclosed embodiments.

For the purposes of the present disclosure, expressions such as "including", "comprising", "incorporating", "consisting of", "have", "is" used to describe and claim the present disclosure are intended to be construed in a nonexclusive manner, namely allowing for items, components or elements not explicitly described also to be present. Reference to the singular is also to be construed to relate to the plural. Further, all joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto. Additionally, the features of various implementing embodiments may be combined to form further embodiments.

Various embodiments of the disclosure may provide a non-transitory, computer-readable medium and/or storage medium, and/or a non-transitory machine readable medium and/or storage medium stored thereon, a set of instructions executable by a machine and/or a computer providing information display. The set of instructions may be executable by the machine and/or the computer (for example the control circuitry 106) to perform the steps that may comprise control of the display device to display a gauge graphic which may comprise a scale for a vehicle parameter and a needle configured to be movable on the scale. The scale may comprise a plurality of regions. The set of instructions may be further executable by the machine and/or the computer to perform the steps that may comprise reception of the first value of the vehicle parameter associated with a vehicle. The set of instructions may be further executable by the machine and/or the computer to perform the steps that may comprise, control, based on a determination that the received first value may be between a first predetermined threshold and a second predetermined threshold, display of a background color gradient on a first region of the plurality of regions of the scale based on the received first value. The set of instructions may be further executable by the machine and/or the computer to perform the steps that may comprise extension of the displayed background color gradient on a second region of the plurality of regions of the scale based on a determination that the received first value exceeds the second predetermined threshold. The second region may display a solid color based on the background color gradient.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. A display system for a vehicle, comprising:
   a display device; and
   control circuitry communicatively coupled to the display device, wherein the control circuitry is configured to:
      control the display device to display a gauge graphic which comprises a scale for a vehicle parameter and a needle configured to be movable on the scale, wherein the scale comprises a plurality of regions including at least a first region between a first scale threshold on the scale and a second scale threshold on the scale, a second region above the second scale threshold, and a third region below the first scale threshold;
      receive a first value of the vehicle parameter associated with the vehicle;
      control a trailing pattern adjoining the needle;
      control, based on a determination that the received first value is between a first predetermined threshold and a second predetermined threshold, the display of a background color gradient as the trailing pattern adjoining the needle on the first region of the plurality of regions of the scale based on the received first value, wherein the first predetermined threshold corresponds to the first scale threshold, and the second predetermined threshold corresponds to the second scale threshold;
      extend the displayed background color gradient to the second region of the plurality of regions of the scale based on a determination that the received first value exceeds the second predetermined threshold, wherein the first region is configured to display the background color gradient and the second region is configured to display a solid color based on the background color gradient as the trailing pattern adjoining the needle; and
      control the display of a blank background on the third region of the plurality of regions of the scale based on a determination that the received first value is less than the first predetermined threshold, wherein the display device is configured to display the blank background on the first region and the second region based on the determination that the received first value is less than the first predetermined threshold.

2. The display system according to claim 1, wherein the display device is one of a Multi-Information Display (MID), an automotive Head-Up Display (HUD), or an instrument cluster.

3. The display system according to claim 1, wherein the control circuitry is further configured to control the display of one or more first predefined labels at a position on the second region of the gauge graphic.

4. The display system according to claim 1, wherein the control circuitry is further configured to control the display of one or more second predefined labels at a position on the third region of the gauge graphic.

5. The display system according to claim 1, wherein the control circuitry is further configured to receive the first value from at least one of an electronic control unit (ECU) or a sensor associated with the vehicle.

6. The display system according to claim 1, wherein the background color gradient on the first region indicates variation of one predefined color.

7. The display system according to claim 1, wherein the background color gradient on the first region indicates variation of multiple predefined colors different from each other.

8. The display system according to claim 7, wherein the multiple predefined colors include a first color displayed close to a first end of the first region and a second color displayed close to a second end of the first region, and wherein the solid color comprises the second color.

9. The display system according to claim 1, wherein the control circuitry is further configured to control the movement of the needle on the scale of the gauge graphic based on the received first value of the vehicle parameter.

10. The display system according to claim 1, wherein the control circuitry is further configured to control the movement of the needle on the scale to indicate a plurality of driving conditions associated with the vehicle and a plurality of emotion modes associated with a driver of the vehicle.

11. The display system according to claim 1, the vehicle parameter comprises one of a power of an engine associated with the vehicle or a relative power of the engine.

12. The display system according to claim 11, wherein the control circuitry is further configured to:
convert the received first value of the power into a display value associated with the scale of the gauge graphic; and
control the movement of the needle on the scale based on the converted display value associated with the scale.

13. The display system according to claim 11, wherein the received first value of the relative power is based on a maximum available power associated with the vehicle.

14. The display system according to claim 13, wherein the maximum available power is based on one of: a catalog maximum power associated with the vehicle, an atmospheric pressure on the vehicle, or an ambient temperature.

15. The display system according to claim 11, wherein the received first value of the power is based on at least one of: radii of wheels of the vehicle, a torque on the wheels, a speed of movement of the vehicle, a position of a gear of the vehicle, or gear ratio information of the gear.

16. A method, comprising:
in a display device of a vehicle:
controlling the display device to display a gauge graphic which comprises a scale for a vehicle parameter and a needle configured to be movable on the scale, wherein the scale comprises a plurality of regions including at least a first region between a first scale threshold on the scale and a second scale threshold on the scale, a second region above the second scale threshold, and a third region below the first scale threshold;
receiving a first value of the vehicle parameter associated with the vehicle;
controlling a trailing pattern adjoining the needle;
controlling, based on a determination that the received first value is between a first predetermined threshold and a second predetermined threshold, the display of a background color gradient as the trailing pattern adjoining the needle on the first region of the plurality of regions of the scale based on the received first value, wherein the first predetermined threshold corresponds to the first scale threshold, and the second predetermined threshold corresponds to the second scale threshold;
extending the displayed background color gradient to the second region of the plurality of regions of the scale based on a determination that the received first value exceeds the second predetermined threshold, wherein the first region displays the background color gradient and the second region displays a solid color based on the background color gradient as the trailing pattern adjoining the needle; and
controlling the display of a blank background on the third region of the plurality of regions of the scale based on a determination that the received first value is less than the first predetermined threshold, wherein the first region and the second region display the blank background based on the determination that the received first value is less than the first predetermined threshold.

17. The method according to claim 16, wherein the vehicle parameter comprises a power of an engine associated with the vehicle or a relative power of the engine.

18. A non-transitory computer-readable medium having stored thereon, computer implemented instructions that when executed by a display system including a display device, causes the display system to execute operations, the operations comprising
controlling the display device to display a gauge graphic which comprises a scale for a vehicle parameter and a needle configured to be movable on the scale, wherein the scale comprises a plurality of regions including at least a first region between a first scale threshold on the scale and a second scale threshold on the scale, a second region above the second scale threshold, and a third region below the first scale threshold;
receiving a first value of the vehicle parameter associated with a vehicle;
controlling a trailing pattern adjoining the needle;
controlling, based on a determination that the received first value is between a first predetermined threshold and a second predetermined threshold, the display of a background color gradient as the trailing pattern adjoining the needle on the first region of the plurality of regions of the scale based on the received first value, wherein the first predetermined threshold corresponds to the first scale threshold, and the second predetermined threshold corresponds to the second scale threshold; and extending the displayed background color gradient to the second region of the plurality of regions of the scale based on a determination that the received first value exceeds the second predetermined threshold, wherein the first region displays the background color gradient and the second region displays a solid color based on the background color gradient as the trailing pattern adjoining the needle; and controlling the display of a blank background on the third region of the plurality of regions of the scale based on a determination that the received first value is less than the first predetermined threshold, wherein the first region and the second region display the blank background based on the determination that the received first value is less than the first predetermined threshold.

* * * * *